United States Patent [19]

Vinciarelli

[11] Patent Number: 5,623,397
[45] Date of Patent: Apr. 22, 1997

[54] POWER CONVERSION IN ANTICIPATORY REVERSE BOOST MODE

[75] Inventor: Patrizio Vinciarelli, Boston, Mass.

[73] Assignee: VLT Corporation, San Antonio, Tex.

[21] Appl. No.: 187,296

[22] Filed: Jan. 27, 1994

[51] Int. Cl.[6] .................................................. H02M 3/335
[52] U.S. Cl. .............................................. 363/20; 363/16
[58] Field of Search .................................. 363/16, 20, 21

[56] References Cited

U.S. PATENT DOCUMENTS

| 4,415,959 | 11/1983 | Vinciarelli | 363/21 |
| 4,441,146 | 4/1984 | Vinciarelli | 363/20 |
| 5,216,586 | 6/1993 | Saito | 363/49 |
| 5,235,502 | 8/1993 | Vinciarelli et al. | 363/20 |

OTHER PUBLICATIONS

Vinciarelli, "High Efficiency Floating Gate Driver Circuit Using Leakage–Inductance Transformer", USSN 07/805,474, filed Dec. 11, 1991, patent application.

Vinciarelli, "Zero–Current Switching Foward Power Converter Operating in Damped Reverse Boost Mode", USSN 07/862,490, filed Apr. 2, 1992, patent application.

Vinciarelli et al., "Packaging Electrical Components", USSN 07/914,347, filed Jul. 17, 1992, patent application.

Primary Examiner—Peter S. Wong
Assistant Examiner—Y. J. Han
Attorney, Agent, or Firm—Fish & Richardson P.C.

[57] ABSTRACT

A power conversion circuit has a port for connection to a power source; a transformer having a primary winding, a secondary winding, and an effective secondary leakage inductance L2e; and a capacitance C connected on a secondary side of the transformer. A first switching device is connected to be opened and closed to transfer energy from the power source via the effective leakage inductance to charge the capacitance during energy transfer cycles having a characteristic time scale of pi*sqrt(L2e*C). Control circuitry controls precharging of the capacitance at selected times other than during the forward energy transfer cycle.

31 Claims, 35 Drawing Sheets

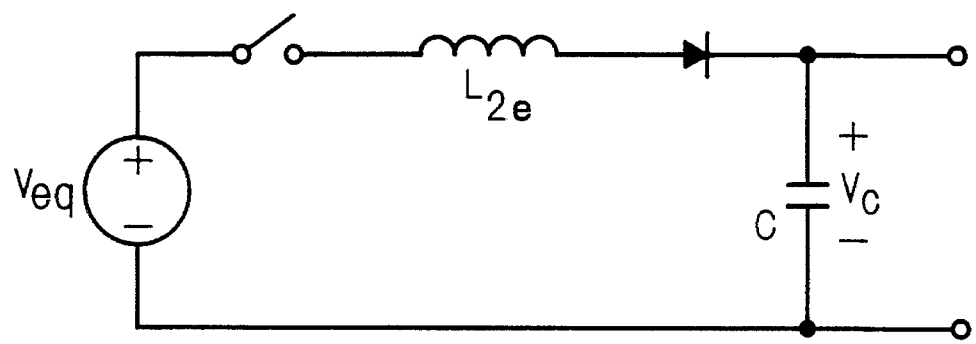
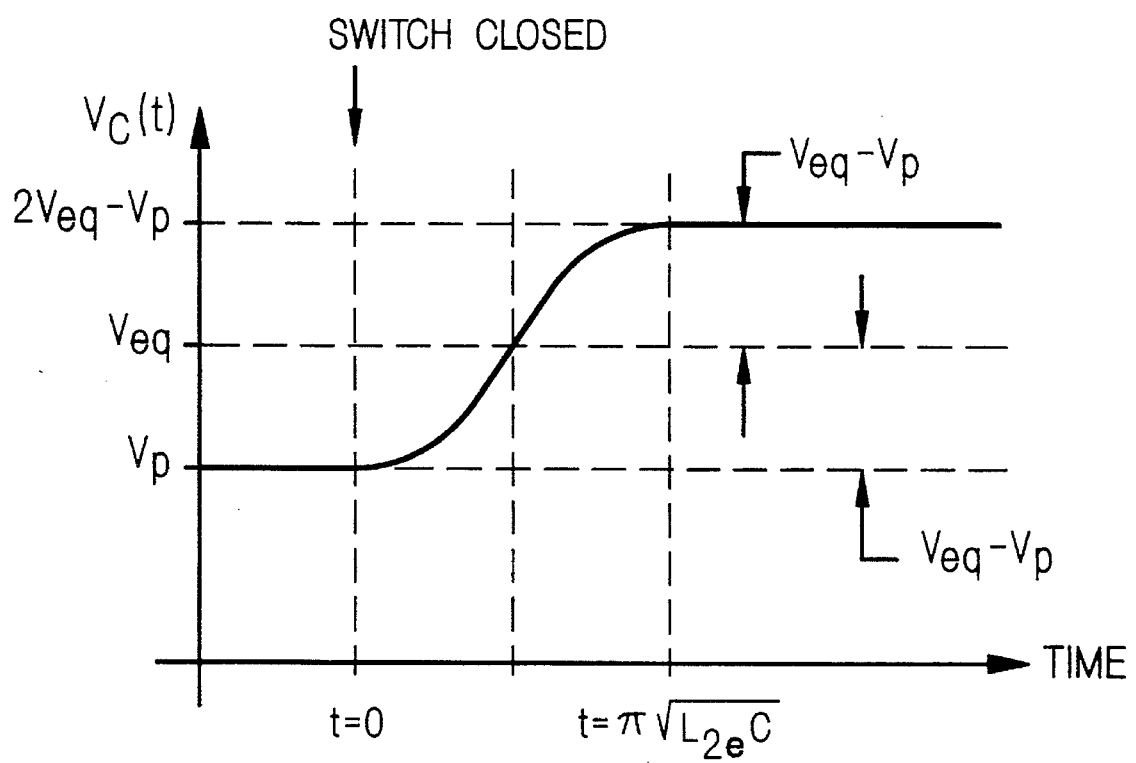
$$V_C(t) = V_{eq} - (V_{eq} - V_p)\cos\left(\frac{t}{\sqrt{L_{2e}C}}\right)$$
FIG. 5

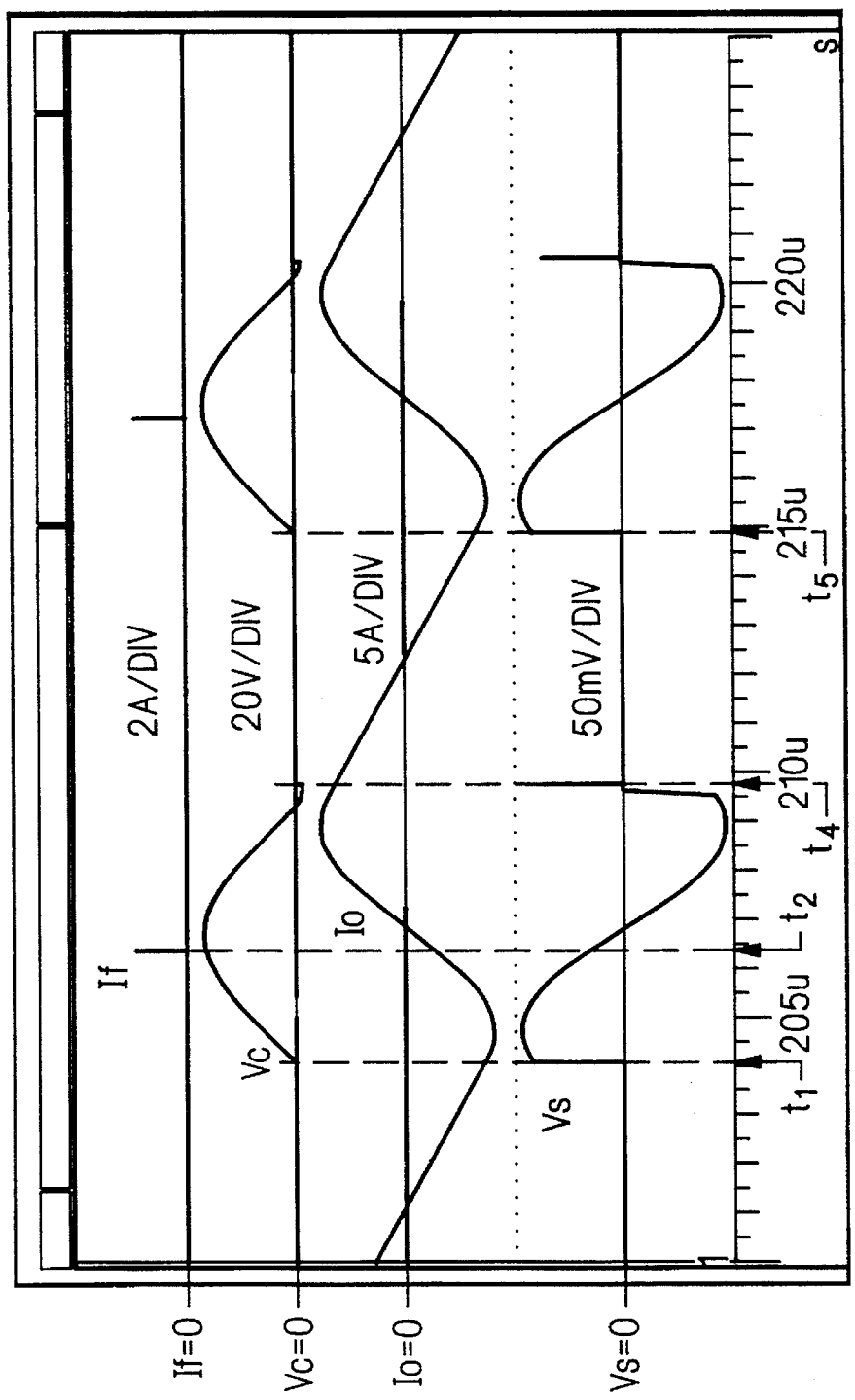

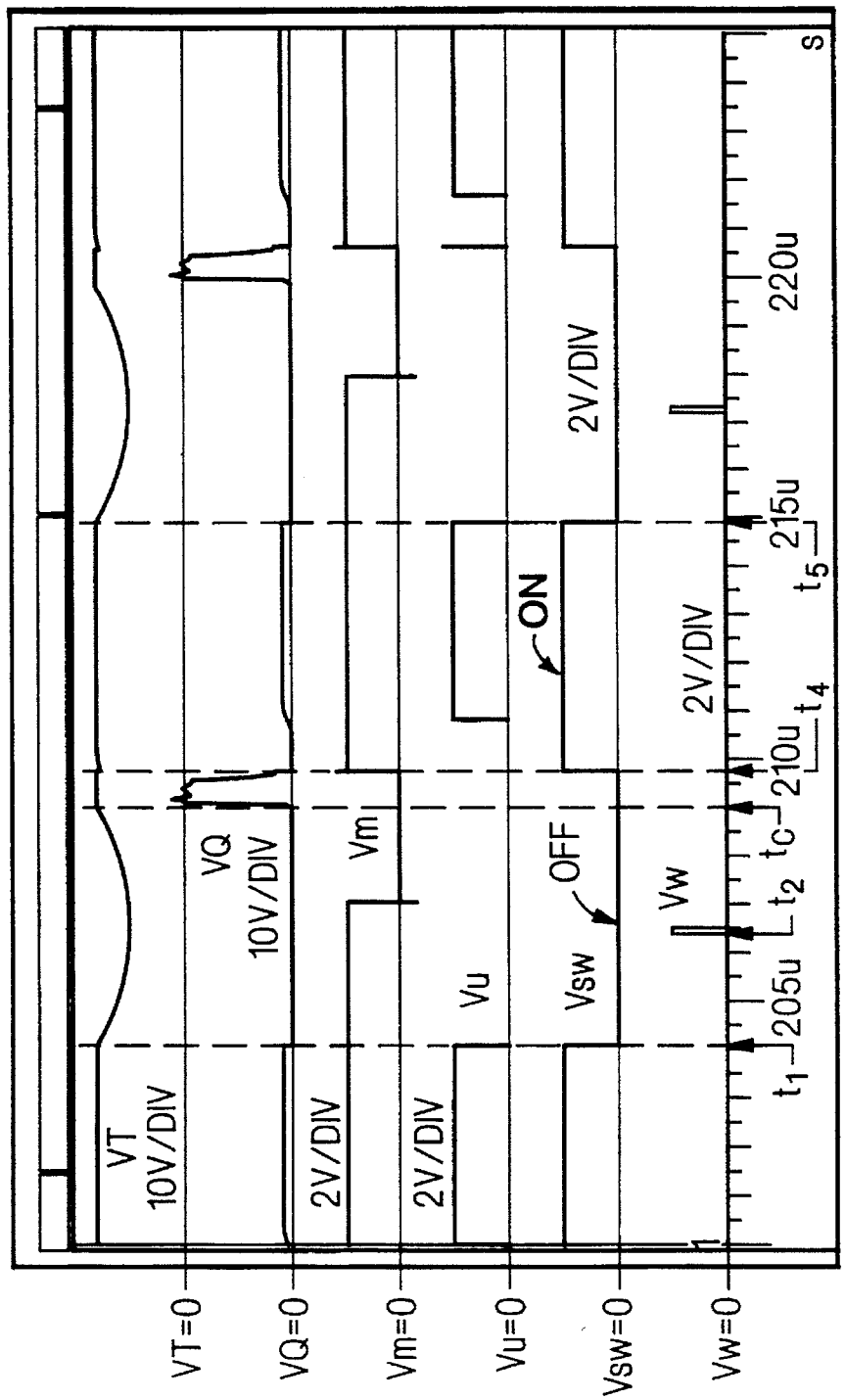

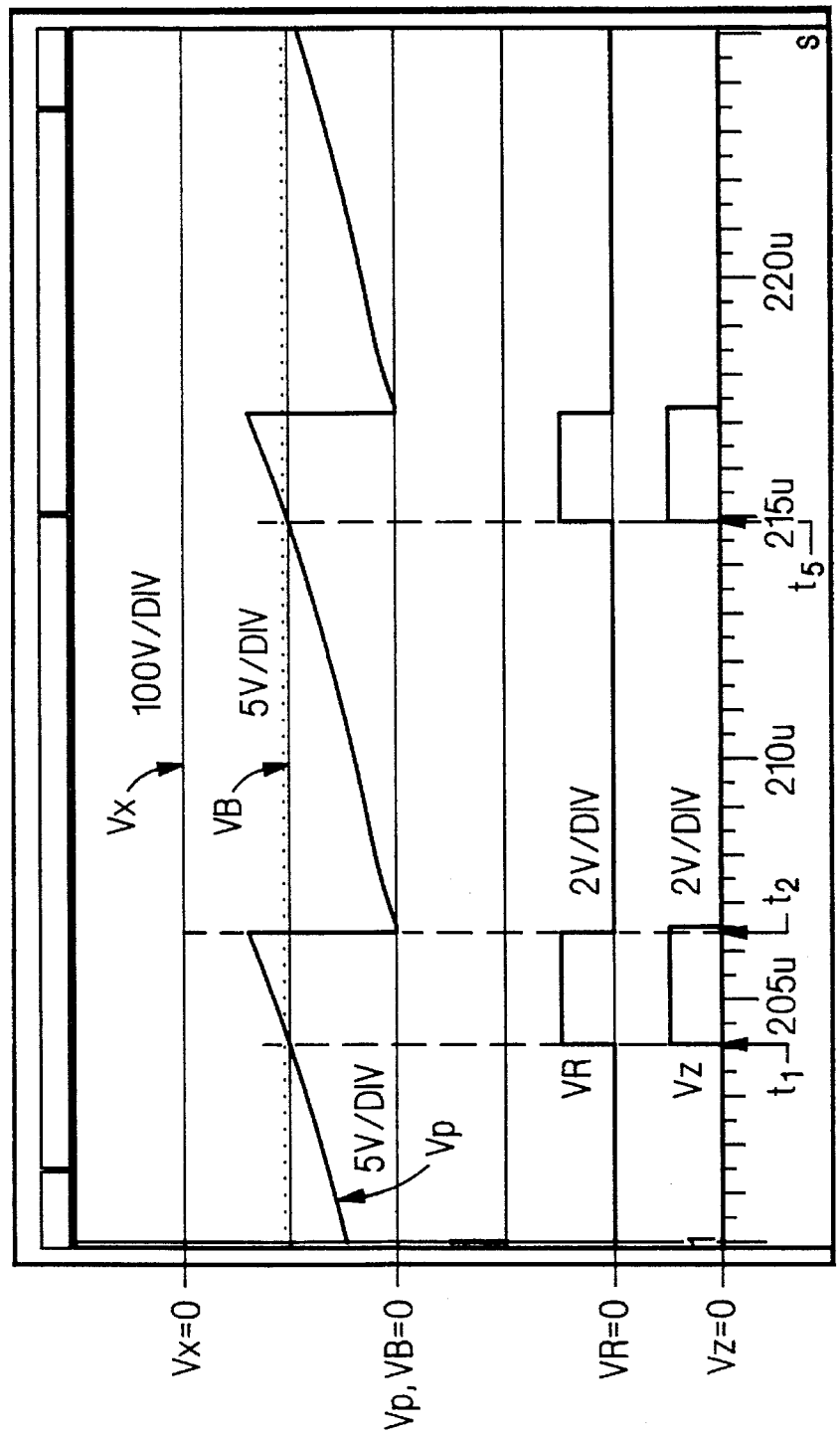

| OPERATING MODE | OPERATING FREQUENCY (KiloHertz) | Io (AMPERES, PEAK-to-PEAK) | SWITCH DISSIPATION (WATTS) |
|---|---|---|---|
| ANTICIPATORY REVERSE BOOST (FIGURE 11) (SWITCH RESISTANCE = .01Ω) | 103 | 6.2 | 0.024 |
| DAMPED ANTICIPATORY REVERSE BOOST (FIGURE 18) (SWITCH RESISTANCE = 1Ω) | 98 | 6.2 | 0.62 |
| DAMPED REVERSE BOOST (FIGURE 3) (SWITCH RESISTANCE = 1Ω) | 64 | 10 | 5.1 |
| REVERSE BOOST (FIGURE 2) (SWITCH RESISTANCE = .01Ω) | 42 | 25 | 0.51 |

FIG. 23

POWER CONVERSION IN ANTICIPATORY REVERSE BOOST MODE

BACKGROUND OF THE INVENTION

This invention relates to power conversion circuits.

FIG. 1 shows a zero-current switching forward converter 10 of the kind described in Vinciarelli, "Forward Converter Switching at Zero-Current," U.S. Pat. No. 4,415,959 (incorporated by reference). In such a converter a finite and bounded amount (quantum) of energy is transferred from the input source 12 to the load 200 during each converter operating cycle. As a result, the amount of power delivered to the load is a function of converter operating frequency (i.e., the number of operating cycles per second). In a typical application, where the output voltage, Vout, is to be maintained at some predetermined value, control circuits 22 are used both to turn the main switch 26 on and off at times of zero current and to vary the converter operating frequency as the power drawn by the external load 200 varies. In theory, as the power drawn by the load is reduced toward zero the operating frequency will also tend to fall to zero. In practical embodiments of such a converter, however, both the finite value of the output inductor 24 and losses in nonideal converter circuit elements will affect converter operation at light loads. Losses in circuit elements will determine the minimum average operating frequency of the converter since, at zero external load 200, the converter will process just enough power to offset the losses in the converter itself. However, at very light external loads, or at zero external load, the converter will not generally operate at a fixed, stable, operating frequency. This is because there will be some value of load below which current reversal will occur in the output inductor 24 (e.g., the current Io will flow towards the capacitor 20 during a portion of the operating cycle). Because of the unidirectional conduction characteristic of diode 18, this reverse current will cause charging of the capacitor 20 and this "precharge" on the capacitor, which will tend to vary from cycle to cycle, will affect the amount of energy transferred forward from the input source during the next operating cycle. The result is a "discontinuous" mode of operation at light loads marked by variations in forward energy transfer during different operating cycles and attendant variations in both the time periods of the operating cycles and in the converter operating frequency.

In general, it is beneficial to reduce the operating frequency range of a zero-current switching converter by raising its minimum operating frequency. For example, increasing the minimum operating frequency allows use of smaller valued converter output filter elements. This allows reducing the physical size and losses in these elements and also provides for wider closed-loop converter operating bandwidths and improved converter response times. Similarly, an increased minimum operating frequency allows use of smaller input filtering elements, for reducing the levels of the frequency components reflected back toward the input source, with similar benefits.

One way of raising the minimum operating frequency in a zero-current switching converter is to provide means for reducing the amount of energy transferred to the load during each energy transfer cycle. One way of accomplishing this is described in Vinciarelli, "Zero Current Switching Forward Power Conversion Apparatus and Method With Controllable Energy Transfer," U.S. Pat. No. 5,235,502, incorporated by reference. The converter described therein, and shown as converter 50 in FIG. 2, incorporates a bidirectional switching element 28 which is turned on and off in synchronism with the main switch in an operating mode called the reverse boost operating mode. In this operating mode, a reverse boost controller 32 turns the bidirectional switch 28 off when the main switch 26 is turned on (thereby enabling forward energy transfer to take place from the input source to the capacitor 20 and thence to the load 200) and turns the bidirectional switch on later in the operating cycle when the capacitor 20 voltage returns to zero. At relatively high values of load power, for which current in the output inductor 24 always flows in the direction of the load, the operation of the converter of FIG. 2 is substantially identical to the operation of the converter of FIG. 1. At light loads, or at zero load, however, for which current reversal in the output inductor 24 does occur, the closed bidirectional switch will conduct the reverse current around the capacitor, thereby preventing uncontrolled charging. When the main switch 26 is closed, and the bidirectional switch is opened, energy is transferred to the capacitor from two directions: "forward" energy transfer from the input source 12 and "reverse" energy transfer from the reverse current flowing in the output inductor 24. The greater the initial value of reverse current (i.e., the value of reverse current flowing in the output inductor 24 at the instant that the main switch is closed) the lower will be the amount of energy which will be transferred forward. Thus, reverse current is exploited as a means of reducing the amount of forward energy transfer. This results in a higher operating frequency at light loads (compared to the converter of FIG. 1) since, for a given value of load power, the reduction in energy-per-cycle will translate into a higher requisite operating frequency. As load is reduced toward zero, frequency will also decline, but this will result in an increase in the initial value of reverse current and a further reduction in forward energy transfer. Since the bidirectional switch and the main switch are synchronized within the operating cycle, the effects of reverse current flow are controlled and predictable on a cycle-by-cycle basis and the "discontinuous" mode is eliminated.

When the converter of FIG. 2 operates in the reverse boost mode, the peak-to-peak value of current flowing in the output inductor may become relatively large as the power drawn by the load is reduced toward zero. In practice this large current, which translates into relatively large RMS currents flowing in the output inductor, bidirectional switch and output filter capacitors (e.g., capacitor 201 in FIG. 2), can result in increased ripple voltage (due both to integrating effect of the output capacitance and to the effect of current flow in the equivalent series impedances of the nonideal output filter capacitors); will produce losses in the finite resistances in the nonideal circuit components, including the bidirectional switch; and may, in general, require use of a relatively large die size for the semiconductor switch selected to embody the bidirectional switch (to minimize power loss in the nonideal switch).

Another scheme for reverse boost is shown in Vinciarelli, "Zero-current Switching Forward Power Converter Operating in Damped Reverse Boost Mode," U.S. Pat. application 07/862,490 (incorporated by reference). In the topology described there, and shown as converter 150 in FIG. 3, a dissipative element 210 is added in series with the bidirectional switch 252 (the diode 250 is also retained to carry the current, Io, when it is flowing in the direction toward the load). The value of the dissipative element is chosen so that the dissipative element 210, in combination with the output inductor 24 and the capacitor 20, forms an approximately critically damped circuit when the bidirectional switch 252 is closed. A reverse boost controller 32 synchronizes the opening and closing of the bidirectional switch with the opening and closing of the main switch using the same protocol described above for the converter of FIG. 2 operating in reverse boost mode. In the converter of FIG. 3, however, the dissipative element acts to limit the peak (and hence the initial) value of reverse current and, in doing so, also acts to dissipate some power. The combined effect is a reduction in forward energy transfer at light or zero loads and an increase in minimum operating frequency owing to both the reduction in forward energy transfer and the losses in the resistive element. When operated in this "damped reverse boost" mode of operation, the converter of FIG. 3 avoids the higher initial values of reverse current associated with the reverse boost operating mode in the converter of FIG. 2 and eliminates the discontinuous operating mode, but does so at the expense of increased dissipation, and wasted power, in the dissipative element 210.

Both the reverse boost and the damped reverse boost operating modes exploit current reversal in the output inductor at light loads as a means of supplying a portion of the total energy delivered to the capacitor 20. This "reverse" energy transfer acts in natural opposition to "forward" transfer of energy to the capacitor from the input source. However, in each of the referenced operating modes the "reverse" energy transfer process is initiated concurrently with initiation of forward energy transfer (i.e., the bidirectional switches 28, 252 are opened by the reverse boost controller at essentially the same time that the main switches 26 are closed). With this switching protocol, reverse current flow can decrease forward energy transfer but it cannot reduce it to zero, as this would require an infinite initial value of reverse current. It is interesting to note, therefore, that if all of the components in the converter of FIG. 2 were ideal (i.e., lossless), use of the reverse boost operating mode would not prevent the converter operating frequency from approaching zero as the power drawn by the load approached zero. For practical embodiments of the converters of FIGS. 2 and 3, however, operating in the reverse boost and damped reverse boost operating modes, respectively, operation at zero external load will occur at a minimum operating frequency at which the finite amount of power transferred forward from the input source is just equal to the total of the dissipative losses in the non-ideal components in the converter (and, in the converter of FIG. 3, the losses in the dissipative element 210). The minimum operating frequency for each of the converters of FIGS. 2 and 3 is higher than the average minimum operating frequency for the converter of FIG. 1 because of the reduction in forward energy transfer at low values of load brought about by the aforementioned reverse boost operating modes. However, the minimum operating frequency is primarily dependent upon losses in nonideal or dissipative components within the converter.

SUMMARY OF THE INVENTION

The invention enables converters to be made smaller and at less cost while achieving relatively high minimum operating frequencies, avoiding discontinuous modes, and providing lower output ripple voltage at light loads for a given amount of output filter capacitance. It achieves this by precharging the capacitance in anticipation of closings of the main switch.

In general, the invention features a power conversion circuit having a port for connection to a power source; a transformer having a primary winding, a secondary winding, and an effective secondary leakage inductance $L_{2e}$; and a capacitance C connected on a secondary side of the transformer. A first switching device is connected to be opened and closed to transfer energy from the power source via the effective leakage inductance to charge the capacitance during a forward energy transfer cycle having a characteristic time scale of $pi*sqrt(L_{2e}*C)$. There is control circuitry connected to control precharging of the capacitance at selected times other than during the forward energy transfer cycle.

Embodiments of the invention include the following features. The control circuitry is configured to govern the times of precharging relative to the onset of the forward energy transfer cycle. The control circuitry includes a second switching device. Precharging is begun by opening the second switching device. A load is connected to receive energy from the capacitance. An inductor is connected to carry current between the capacitance and the load. The second switching device is connected in parallel with the capacitance and in series with the inductor. A unidirectional conducting device is connected in series with the secondary winding and oriented to conduct during conduction by the first switching device.

The control circuitry includes a port for receiving a signal indicative of a rate of change of voltage across the capacitance, and a port for receiving a signal indicative of a frequency of operation of the circuit, and those signals are used in controlling the precharging.

In some embodiments, the second switching device is an essentially lossless switch. In some embodiments the second switching device has finite resistance. The second switching device may include a switch and a finite resistance external to the switch. The second switching device may be a MOSFET. A unidirectional conducting device may be connected across the second switching device and poled to conduct current in the direction of the load (e.g., in a direction opposite to the direction of conduction of the MOSFET).

The circuit may be operated in a mode having a conversion operating cycle of which the forward energy transfer cycle is a portion, and where the conversion operating cycle includes another portion in which reverse current flowing from the load is available to charge the capacitance, the reverse current being routed to the capacitor to achieve precharging. The first switching device is turned on and turned off at times when current through the first switching device is essentially zero. The frequency of switching of the first switching device is controlled to maintain an output voltage of the circuit at a predetermined value.

A condition for turning on the second switching device is approximately an occurrence of a time when a voltage across the capacitor is essentially zero. The second switching device is turned off approximately at a time such that the subsequent forward energy transfer cycle will tend to begin when a voltage across the capacitor is at a maximum. The time occurs briefly prior to when the voltage across the capacitor is maximum. The maximum comprises the first maximum to occur following the time when the second switching device is turned off. The precharging is disabled in periods when the reverse current does not flow during the conversion operating cycle.

Other advantages and features will become apparent from the following description and from the claims.

DESCRIPTION

FIG. 5 illustrates a circuit and the effect of the presence of a precharge voltage on the peak voltage to which a capacitor will be charged in the circuit.

FIGS. 12A–12N show operating waveforms for the converter of FIG. 11 operating at essentially zero load conditions.

FIG. 23 shows a table comparing the performance of four kinds of converters.

Figure 4A:
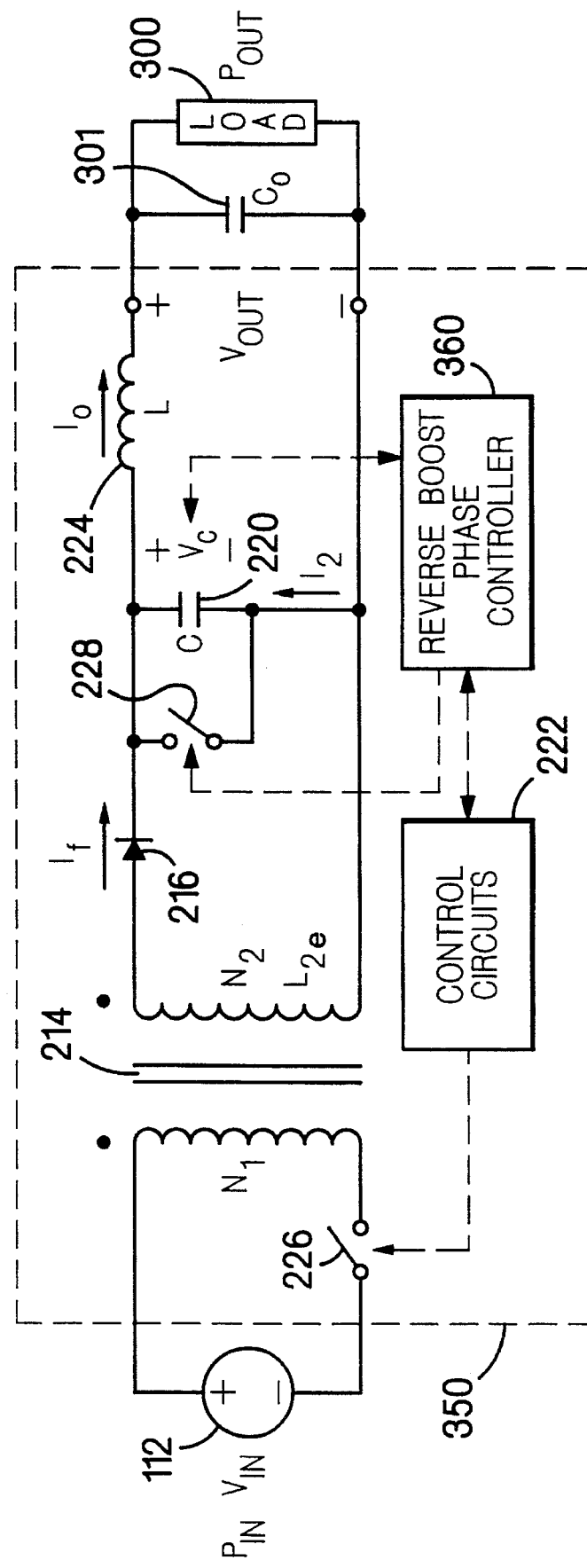
FIGS. 4A and 4B show schematic diagrams for isolated and non-isolated embodiments of a zero-current switching DC—DC converter which includes a controller for operating the converter in an anticipatory reverse boost mode of operation.
Figure 4B:
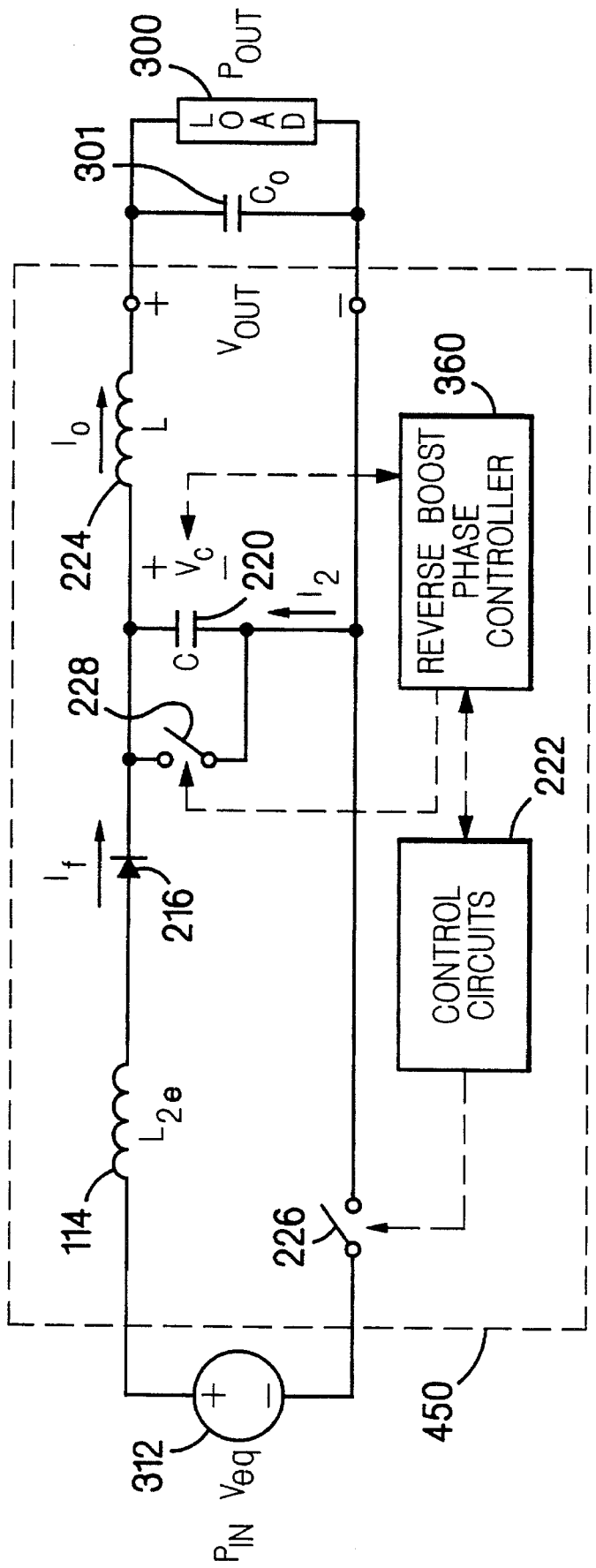

An improved zero-current switching converter, which can be operated in a mode which improves upon the performance of the reverse boost and damped reverse boost operating modes, is illustrated in FIGS. 4A and 4B. In FIG. 4A the new converter 350 includes power conversion circuitry which is essentially identical to the corresponding circuitry in the converter 50 of FIG. 2, consisting of: a leakage inductance transformer 214 having a primary winding with N1 turns, a secondary winding with N2 turns, a turns ratio N=N1/N2, and a secondary-reflected effective leakage inductance of value L2e; a main switch 226; a forward diode 216; a bidirectional switch 228; a capacitor 220, of value C; an output inductor 224, of value L, where L is large relative to L2e; and control circuits 222. The converter accepts power from an input voltage source 112, of value Vin, and delivers power to an external load 300 in a series of forward energy transfer cycles. The value of the secondary-reflected effective leakage inductance, L2e, and the value of the capacitor, C, define a characteristic time scale T=pi*sqrt(L2e*C) for the rise and fall of the voltages and currents associated with the charging of the capacitor 220 from the input source 112, via the effective leakage inductance of the transformer, during each energy transfer cycle. An output filter capacitor 301 is shown connected across the external load. The converter of FIG. 4A differs from the converter of FIG. 2 in that the reverse boost controller 32 Of FIG. 2 has been replaced with a new controller called a reverse boost phase controller 360. An approximate equivalent circuit for the converter of FIG. 4A is shown in FIG. 4B, where the leakage inductance transformer 214 and the input voltage source 112 of FIG. 4A have been replaced, respectively, with a discrete inductance 114 having a value, L2e, equal to the secondary-reflected effective leakage inductance of transformer 214 of FIG. 4A, and an equivalent input voltage source 312 of a value equal to the secondary-reflected equivalent input voltage, Veq=Vin/N, where N is the turns ratio, defined above, of the transformer 214. FIG. 4B is also representative of a non-isolated version of the converter of FIG. 4A, where the inductor 114 and the input source 312 are not equivalent circuit values but are actual circuit components. The discussion which follows applies to both the converter of FIG. 4A and the converter of FIG. 4B.

The operation of the converter of FIG. 4A is based in the principle that if the capacitor 220 is precharged to a voltage, Vp, at the time that a forward energy transfer cycle is initiated (e.g., when the main switch 226 is closed), then the energy transferred forward from the input source to the capacitor will be reduced relative to the amount of energy which would otherwise be transferred forward if Vp were zero. The principle is illustrated in FIG. 5, which shows a circuit model consisting of an input source, of value Veq, an inductance, of value L2e, a capacitor, of value C, a switch and a diode (which are representative of the circuit elements within the zerocurrent switching converters of FIGS. 1, 2, 3, or 4 associated with forward energy transfer). The Figure also shows a waveform for the capacitor voltage for the case where the capacitor is precharged to a voltage Vp (where Vp is less than Veq) at the time that the switch is closed (i.e., at time t=0). Prior to t=0, the capacitor voltage is equal to the precharge voltage, Vp, and after t=0 the voltage rises sinusoidally to a value which is above Veq in a amount equal to (Veq–Vp). Thus, if Vp were zero, the peak voltage on the capacitor would rise to 2Veq and the energy transferred forward from the input source would be equal to $4CVeq^2$. However, as Vp rises in value toward Veq both the peak capacitor voltage and the amount of energy transferred forward decline. If the precharge voltage, Vp, is equal to (or greater than) the secondary-reflected input voltage, Veq, then closure of the switch will have no effect on the peak capacitor voltage and there will be no energy transferred forward whatsoever.

This principle is exploited in the converter of FIG. 4A by providing a reverse boost phase controller 360 which can control the timing of the opening of the boost switch 228 to occur in anticipation of the closing of the main switch 226 during each converter operating cycle. At low values of load, for which current reversal occurs in the output inductor 224, opening the boost switch prior to closing the main switch will cause energy stored in the output inductor to precharge the capacitor 220. This precharge will then reduce the energy transferred forward when the main switch is subsequently closed. Thus, the reverse boost phase controller 360 of FIG.

Figure 1:
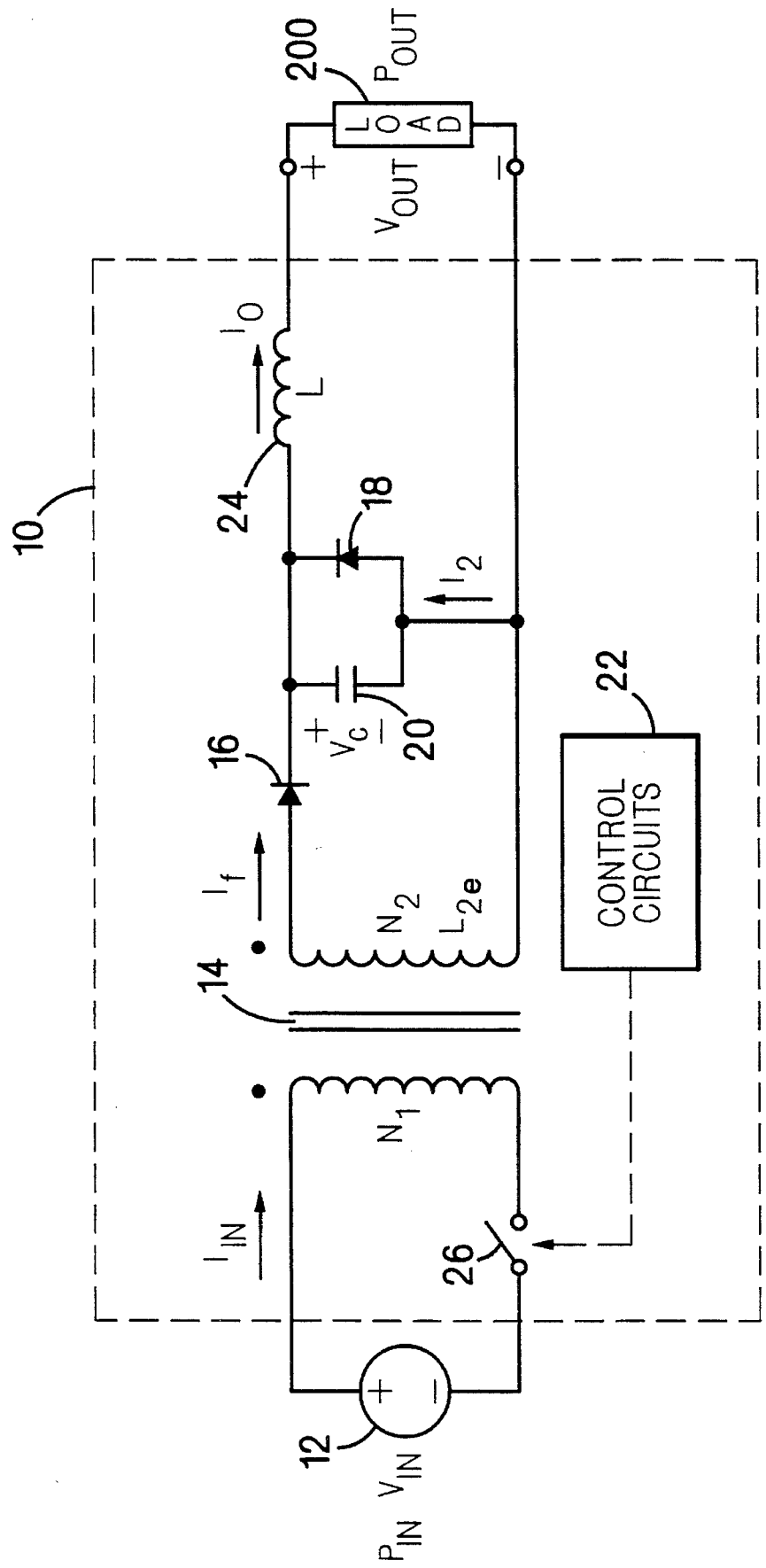
FIG. 1 shows a schematic diagram of a zero-current switching converter.
Figure 2:
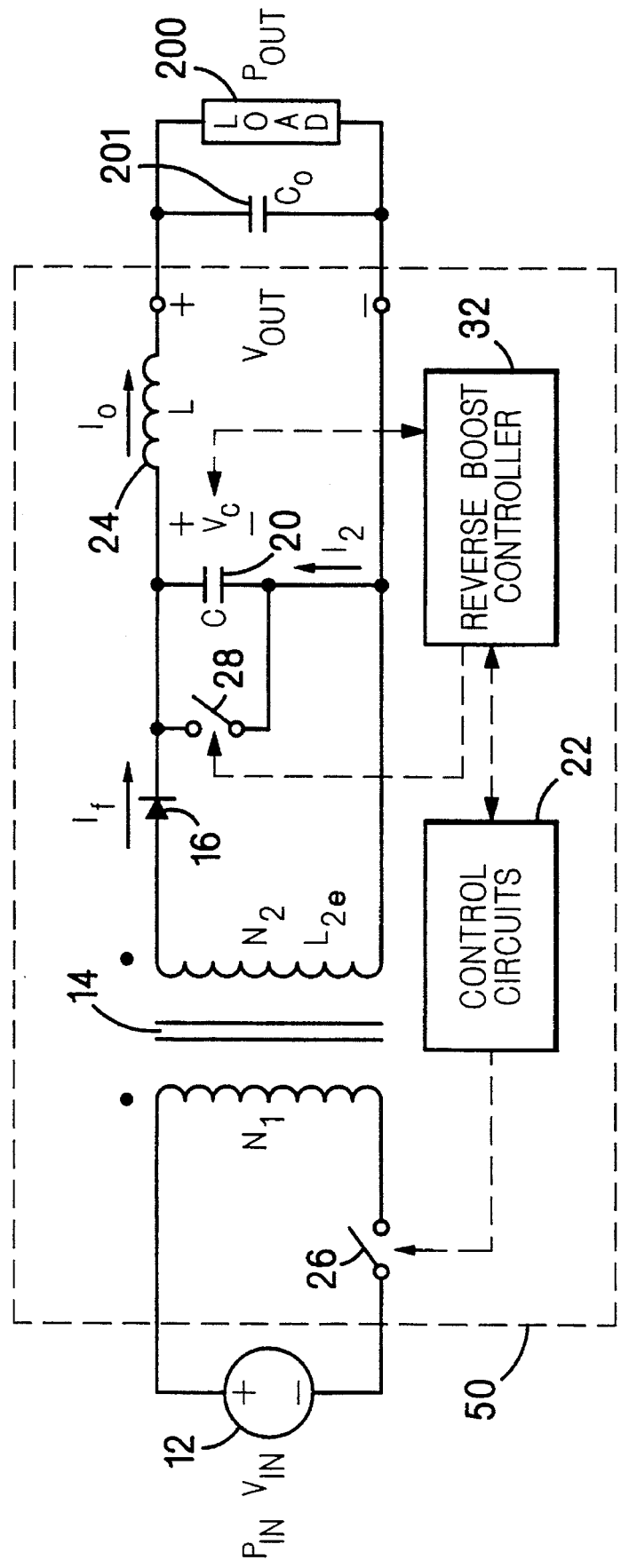
FIG. 2 shows a schematic diagram of a zero-current switching DC—DC converter which includes circuit and control elements for operating the converter in a reverse boost mode of operation.
Figure 3:
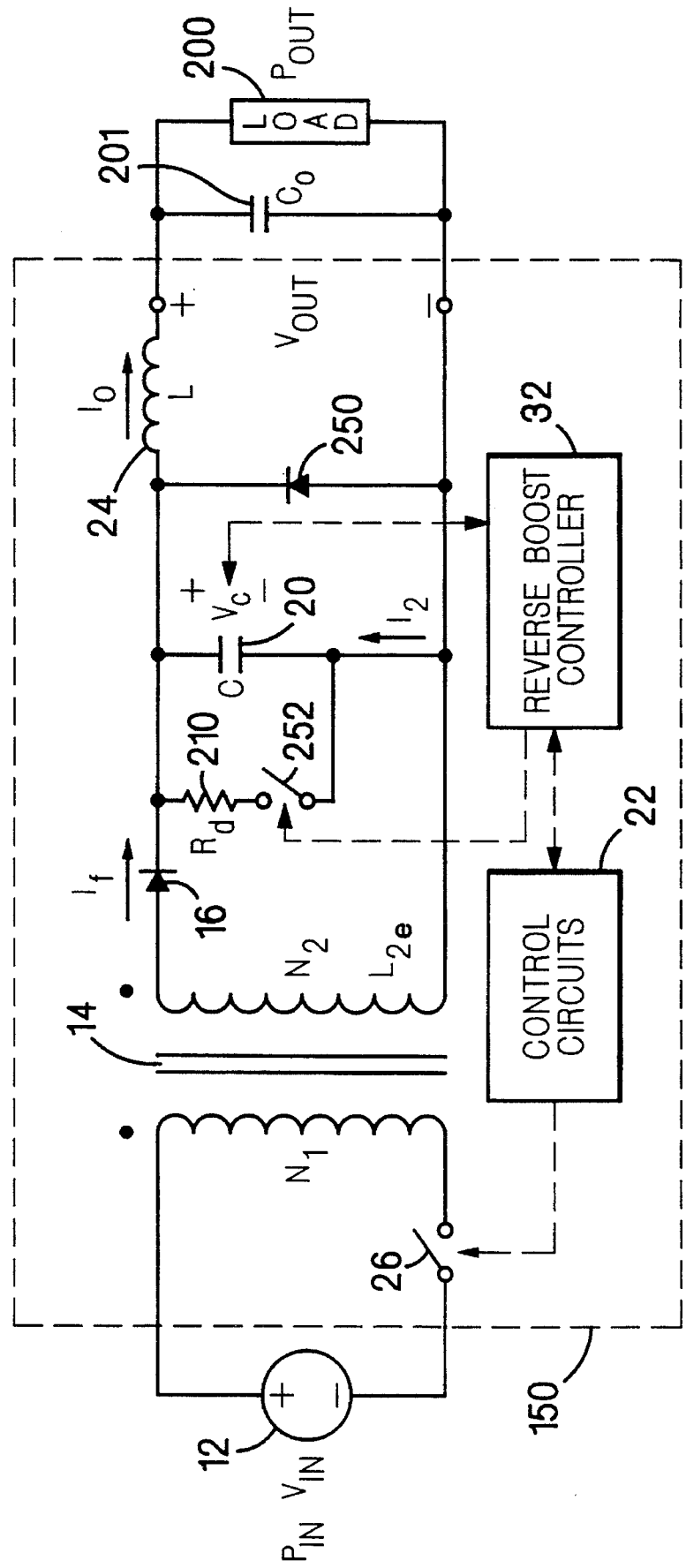
FIG. 3 shows a schematic diagram of a zero-current switching DC—DC converter which includes circuit and control elements for operating the converter in a damped reverse boost mode of operation.

4 differs from the reverse boost controllers 32 of FIGS. 2 and 3 in that it can adjust the "phase" (i.e., the relative point in time during an operating cycle) of the opening of the boost switch relative to the closure of the main switch. In contrast to the converters of FIGS. 2 and 3, where the underlying cause for the dependence of minimum converter operating frequency on losses in converter circuit elements was the fixed phasing of the opening of the boost switch relative to the main switch (i.e., the boost switch was opened simultaneously with closure of the main switch), the "phase control" afforded by the controller of FIG. 4A can be exploited to cause the capacitor to be precharged during each operating cycle to a voltage sufficient to arrest forward energy transfer at values of converter operating frequency which are essentially independent of losses in circuit elements.

The converter of FIG. 4A includes two controllers: control circuits 222 and the reverse boost phase controller 360. Control circuits 222 are of the kind which turn the main switch 226 on and off (at times of zero current) at a converter operating frequency which is consistent with maintaining the converter output voltage Vout at some predetermined value. Feedback controllers of this type are well known in the art (see, for example, Vinciarelli, U.S. Pat. No. 4,415,959 and Vinciarelli, U.S. patent application Ser. No. 07/862,490). Because the converter control variable being adjusted by the control circuits 222 is the converter operating frequency this controller will be referred to as the "frequency controller." The reverse boost phase controller 360 (which will be referred to as the "phase controller") controls the timing of the opening of the boost switch 228 during an operating cycle relative to the closing of the main switch 226. At relatively high values of load, for which current reversal in the output inductor does not occur, the phase controller 360 Opens and closes the boost switch using the same switching protocol used by the reverse boost controllers 32 of FIGS. 2 and 3. Thus, for relatively high values of load, operation of the converter of FIG. 4A is substantially identical to the converters of FIGS. 1, 2 and 3. However, at low values of load, for which current reversal in the output inductor 224 does occur, the phase controller 360 Of FIG. 4A adjusts the timing of the opening the boost Switch to occur in anticipation of the closing of the main switch.

One operating mode of the converter of FIG. 4A is illustrated with reference to the waveforms in FIGS. 6 through 10. In this operating mode, the control objective chosen for the reverse boost phase controller 360 is one which seeks to optimally exploit reverse current flow at low values of load so as to maximize the operating frequency of the converter under conditions of zero load. The control strategy involves using the "phase controller" 360 to control the time at which the boost switch is opened such that subsequent closure of the main switch (by the "frequency controller" 222) occurs when the "precharge" voltage induced on the capacitor by current reversal in the output inductor is at a maximum. All of the waveforms in the Figures are for a converter (of the kind shown in FIGS. 4A and 4B) having the following (essentially ideal) circuit element values (e.g., the values of the circuit elements shown in FIG. 4A and 4B): Veq=Vin/N=15 Volts; Vout=5 Volts DC (the load is presumed to be an essentially constant voltage load, e.g., a battery or a load bypassed by a sufficiently large output filter capacitor); L2e=30 nanoHenry; C=0.44 microFarad; L=4 microHenry.

Figure 6:
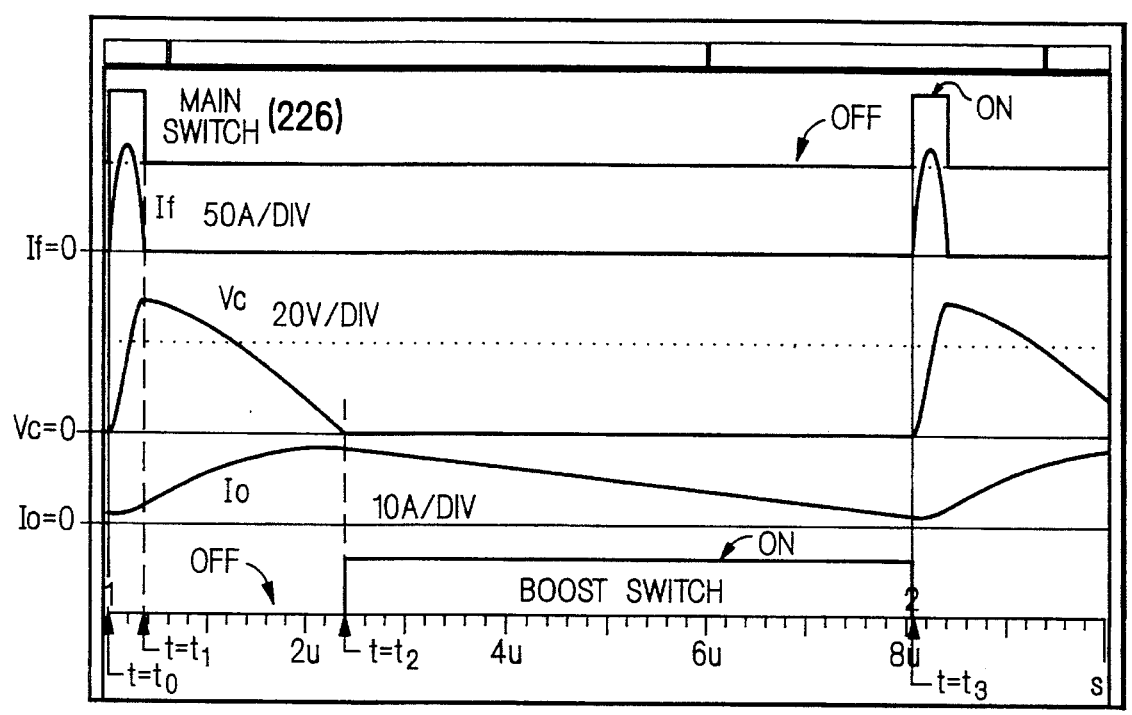
FIG. 6 shows waveforms for a converter of the kind shown in FIGS. 4A and 4B when the converter is delivering a sufficient amount of power to a load such that current reversal in the converter output inductor does not occur.

For reference, FIG. 6 shows waveforms for the converter under a light load condition (22 Watts) for which current in the output inductor closely approaches zero but for which current reversal does not occur. As shown in the Figure, the boost switch 228 is opened at essentially the same time that the main switch 226 is closed (at time t=to). Between t=to and t=t1 the flow of forward current, If, transfers energy to the capacitor 220 during a forward energy transfer cycle during which both the forward current, If, and the capacitor voltage, Vc, vary essentially sinusoidally with a characteristic time constant T=pi*sqrt(L2e*C). At time t=t1, the current If returns to zero and the main switch is opened. Between time t=t1 and t=t2 the energy stored in the capacitor is transferred toward the load via the output inductor 224 and the capacitor 220 voltage, Vc, declines. During this time period both the capacitor voltage, Vc, and the current in the output inductor, Io, vary with a characteristic time constant To=pi*sqrt(L*C). At time t=t2, when the capacitor voltage reaches zero, the boost switch 228 is closed, bypassing the flow of current Io around the capacitor. At time t=t3 another identical cycle begins. The converter operating frequency at this value of load is 112.2 KHz. It is also to be noted that the capacitor voltage, Vc, peaks at a value very close to 30 Volts, which is twice the value of Veq (Veq=15 Volts) and which corresponds to the value predicted in FIG. 5 for the voltage rise of a discharged capacitor (Vp=0). It should also be noted that since current reversal does not occur in the output inductor, the operating waveforms shown in FIG. 6 would be substantially the same for any of the converters of FIGS. 1, 2 and 3 having the same circuit values and operating at the same value of load. In the absence of current reversal, the timing of the opening and closing of the boost switch 228 effectively causes the switch to emulate the effects of the diode 18 in the converter of FIG. 1. Said another way, when the converter is operating at loads for which current reversal in the output inductor does not occur, the phase controller 360 asserts no direct control over the phase of the opening of the boost switch relative to the main switch; rather it always opens it at "zero phase" (e.g., at essentially the same time that the main switch is closed). Only "frequency control" is asserted under these conditions (by control circuits 222) as a means of maintaining the output voltage at the desired, predetermined, value.

Figure 7:
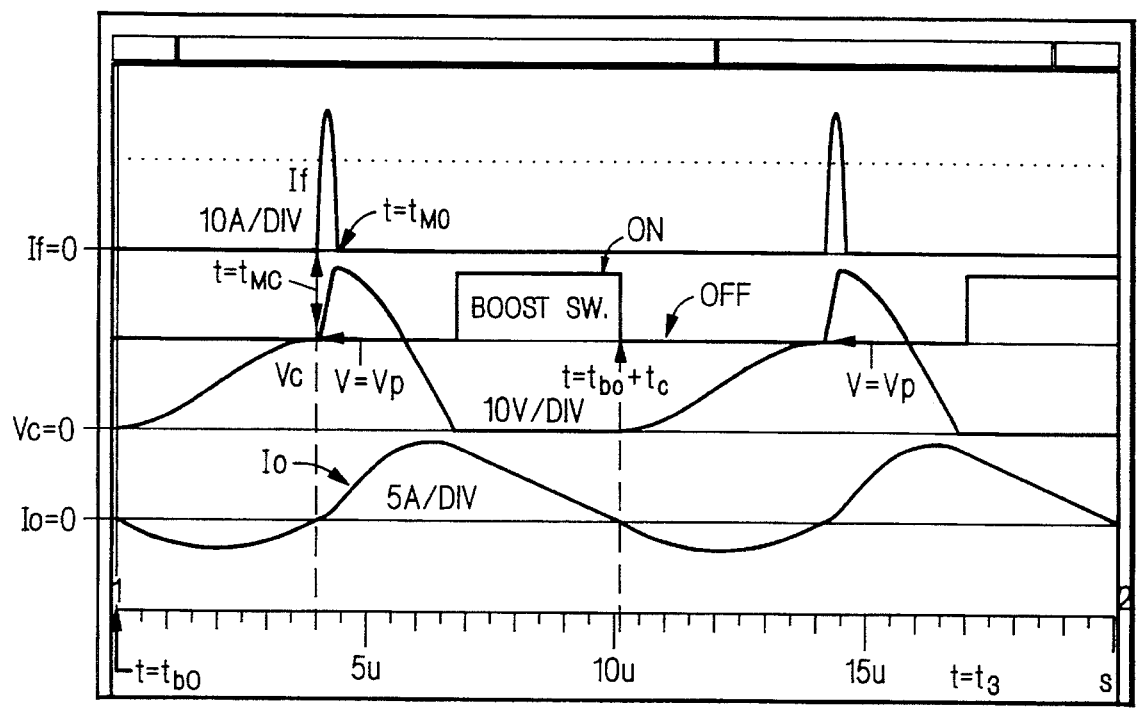
FIGS. 7–10 shows waveforms for a converter of the kind shown in FIGS. 4A and 4B when the converter is delivering relatively low values of load power for which current reversal occurs in the converter output inductor.

In FIG. 7, the load has been reduced to 6.3 Watts and current reversal occurs in the output inductor 224. The waveforms in the Figure illustrate both the nature of the phase controlled reverse boost strategy being used and the effect of the strategy on forward energy transfer. We first note that the opening of the boost switch 228 (at t=tbo), occurs in advance of the closure of the main switch (at t=tmc). Following the opening of the boost switch, energy is (resonantly) transferred back to the capacitor 220 from the converter output and, between time t=tbo and t=tmc, both the capacitor voltage, Vc, and the (reverse) current in the output inductor, Io, vary sinusoidally with a characteristic time constant To=pi*sqrt(L*C). The voltage across the capacitor resonates to its peak value, Vp, at t=tmc, at which time the main switch is closed. Between times t=tmc and t=tmo, the main switch is closed and a forward energy transfer cycle occurs during which both the forward current, If, and the capacitor voltage, Vc, vary essentially sinusoidally with a characteristic time constant T=pi*sqrt(L2e*C). Since the capacitor had been precharged to a voltage Vp (approximately equal to 10 Volts, as seen in the Figure) at the time that the forward energy transfer cycle was initiated, the maximum value of capacitor voltage reached during the forward energy transfer cycle is reduced. Thus, while the approximate value of the peak capacitor voltage in FIG. 6 was 30 Volts (for Veq=15, Vo=5, and Vp=0), the value in FIG. 7 is 20 Volts (for Veq=15, Vo=5, and Vp=10). In both instances the peak capacitor voltage corresponds closely to the value predicted in FIG. 5. Between time t=tmo and t=tbc the energy stored in the capacitor is transferred toward the load via the output inductor and the capacitor voltage, Vc, declines. During this time period both the capacitor voltage, Vc, and the current in the output inductor, Io, vary with a characteristic time constant To=pi*sqrt(L*C). At time t=tbc, when the capacitor voltage reaches zero, the boost switch is closed, bypassing the flow of current Io around the capacitor. At time t=tbo+Tc (where Tc is the period of the operating cycle) another identical cycle begins. That the effect of opening the boost switch prior to closure of the main switch results in a reduction in forward energy transfer per cycle can be seen by comparing FIGS. 6 and 7. In FIG. 6 the peak value of Vc is 30 volts and the peak value of If is 58 Amperes; in FIG. 7 the peak value of Vc is 20 Volts and the peak value of If is 19 Amperes. The reduction in both of these peak values indicates a reduction in forward energy flow, since, for fixed values of Veq and Vout, the peak values of both Vc and If are indicative of the amount of energy transferred forward. It should also be noted that the converter operating frequency in FIG. 7, for a load of 6.3 Watts, is 95 KHz, compared to an operating frequency of 112 Khz in FIG. 6, for a load of 22 Watts. Thus, despite the fact that the load in FIG. 7 has been reduced to 28% of the value in FIG. 6, the converter operating frequency in FIG. 7 remains at 85% of the operating frequency in FIG. 6.

Figure 8:
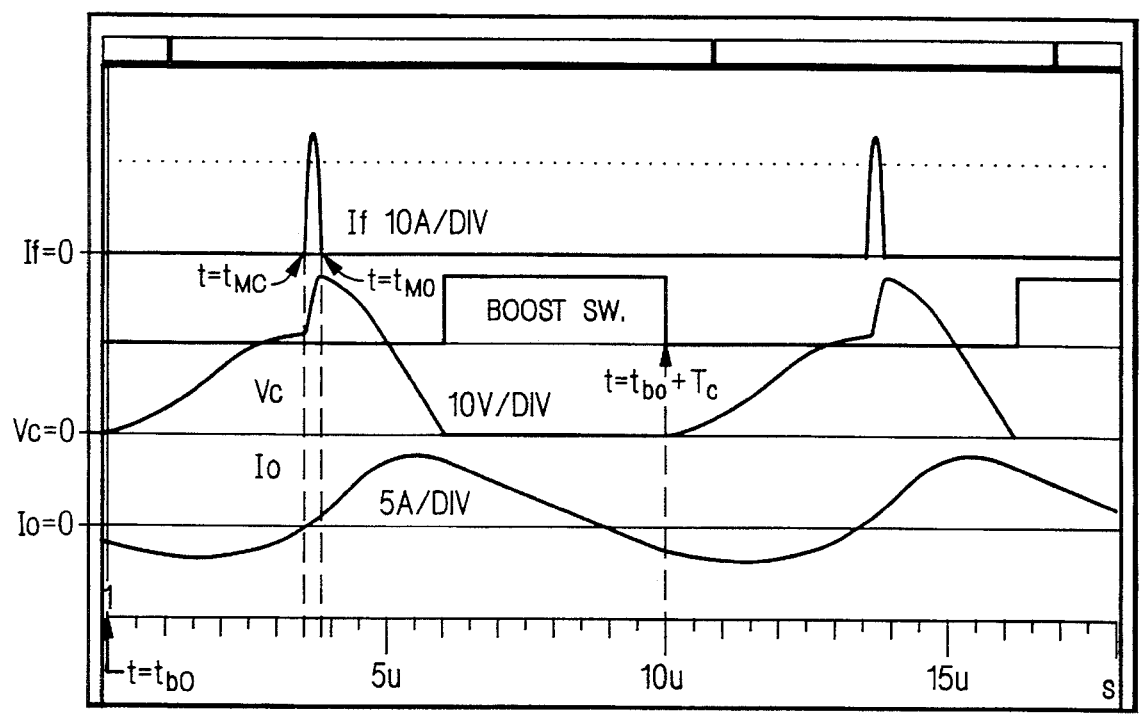
Figure 9:
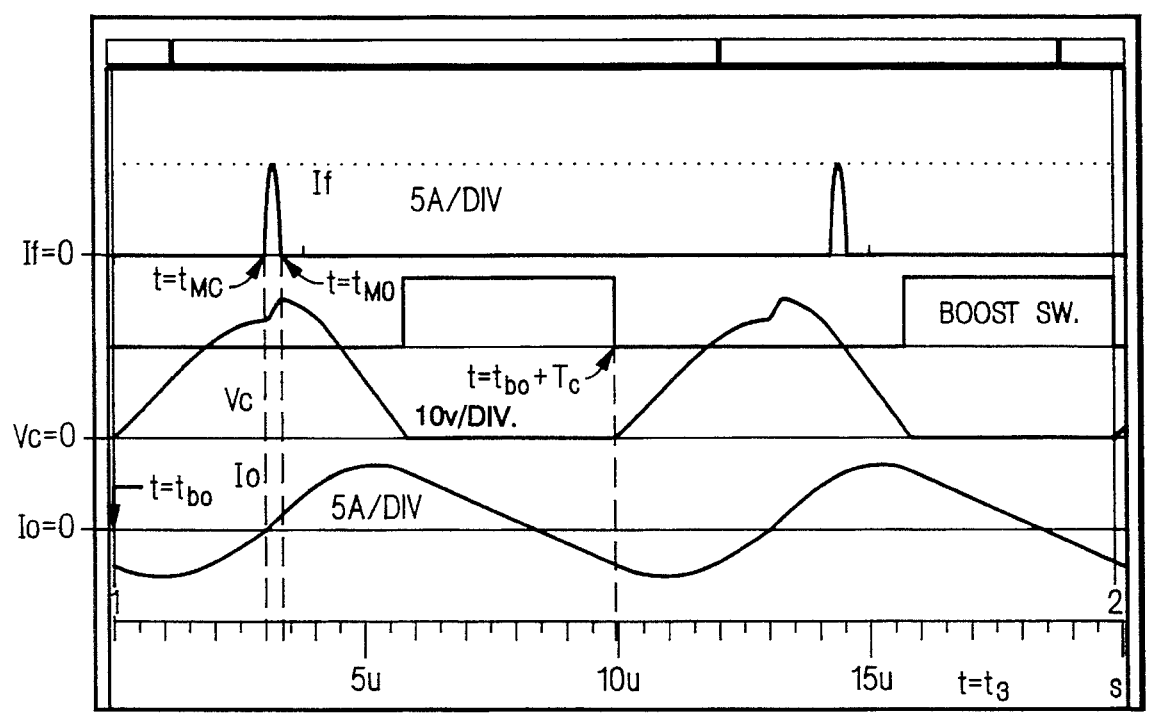
Figure 10:
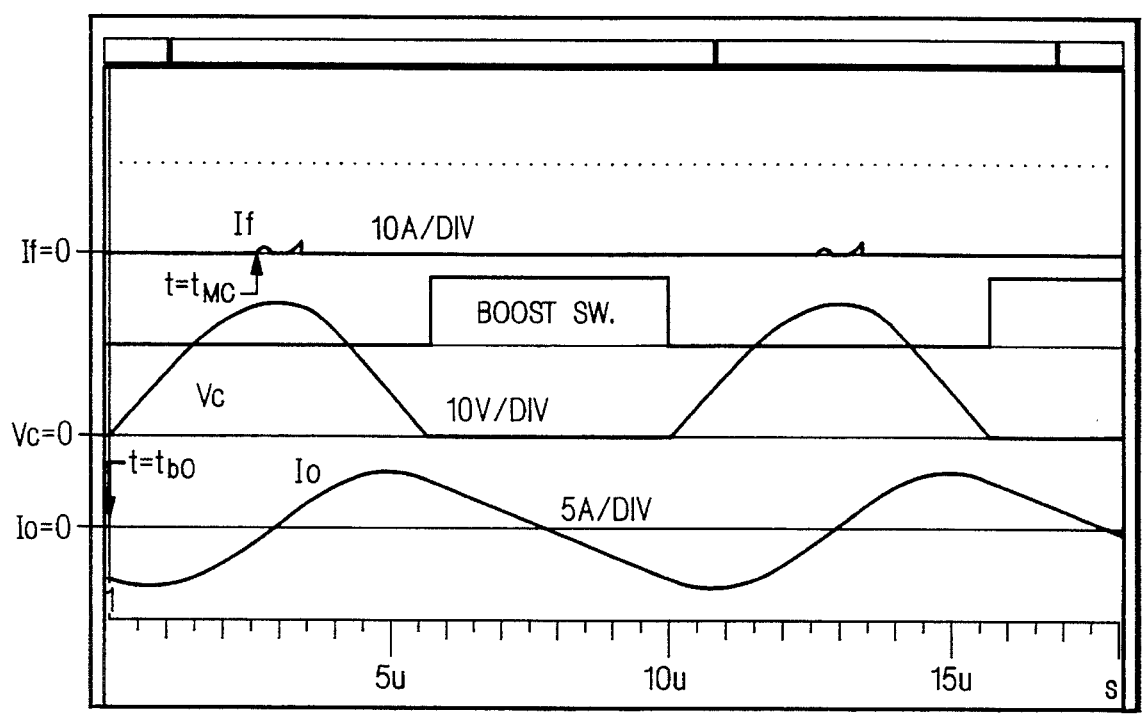
Figure 11A:
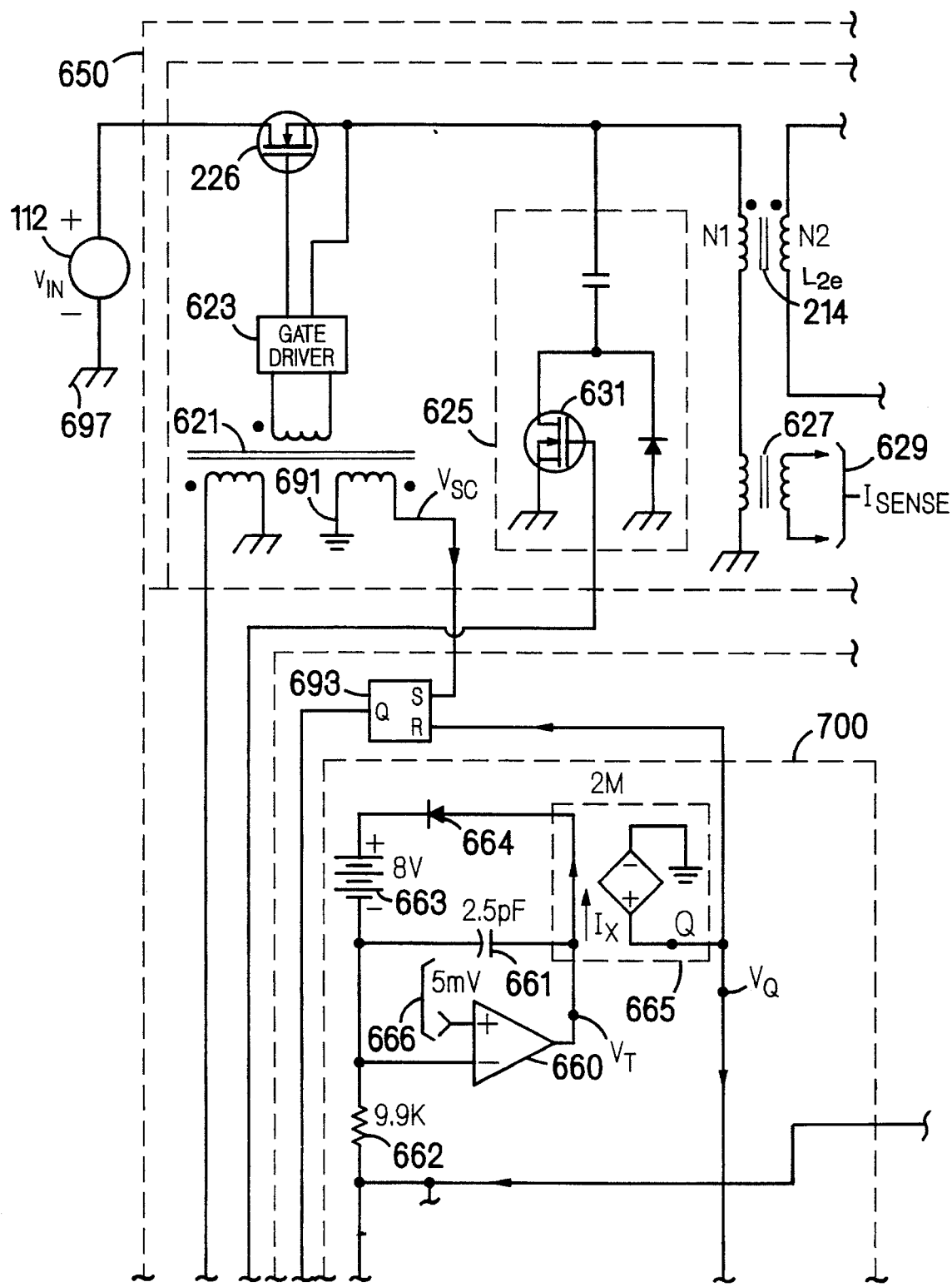
FIG. 11 shows a schematic diagram of an embodiment of an anticipatory reverse boost DC—DC converter which includes a schematic diagram of a reverse boost phase controller.
Figure 11B:
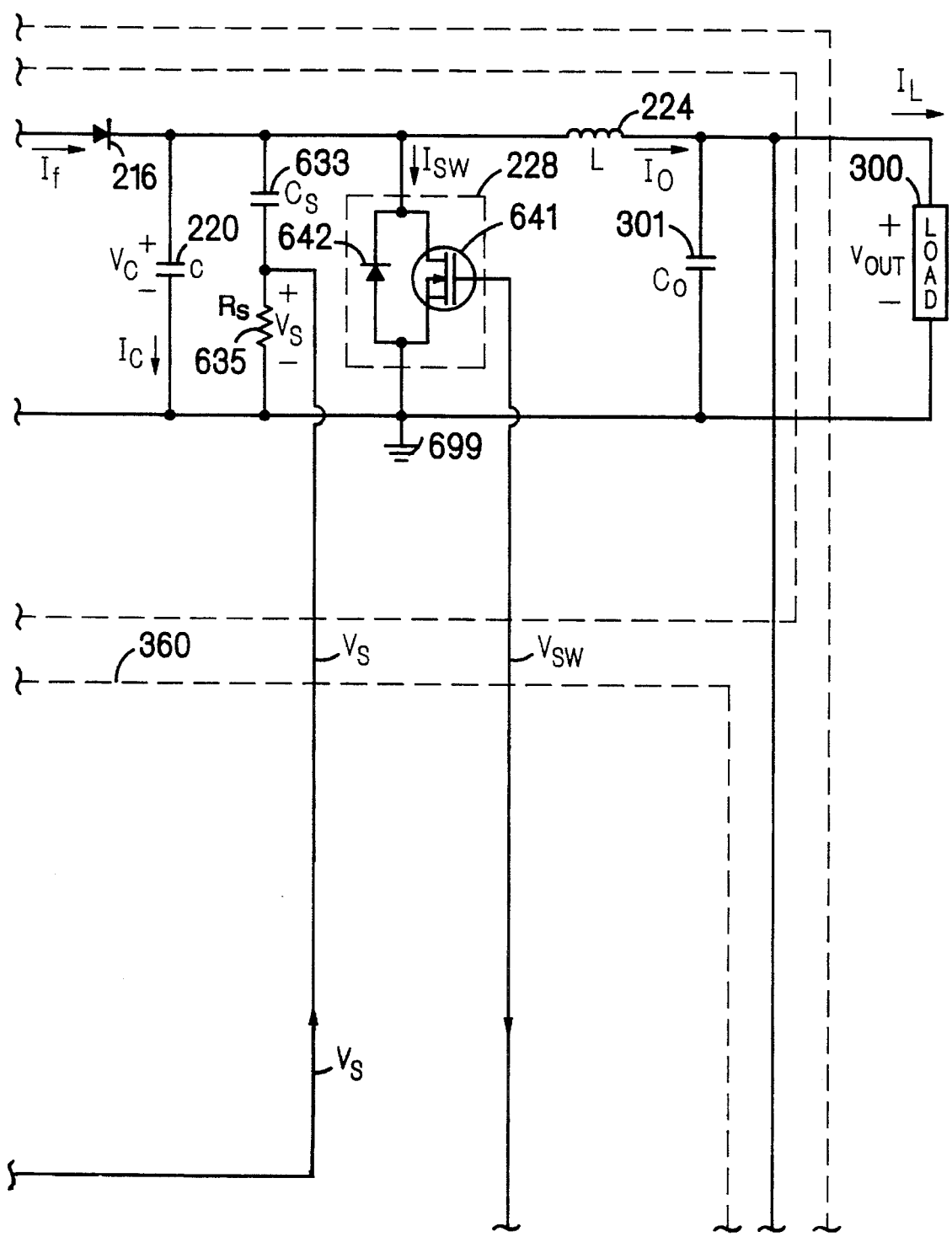
Figure 11C:
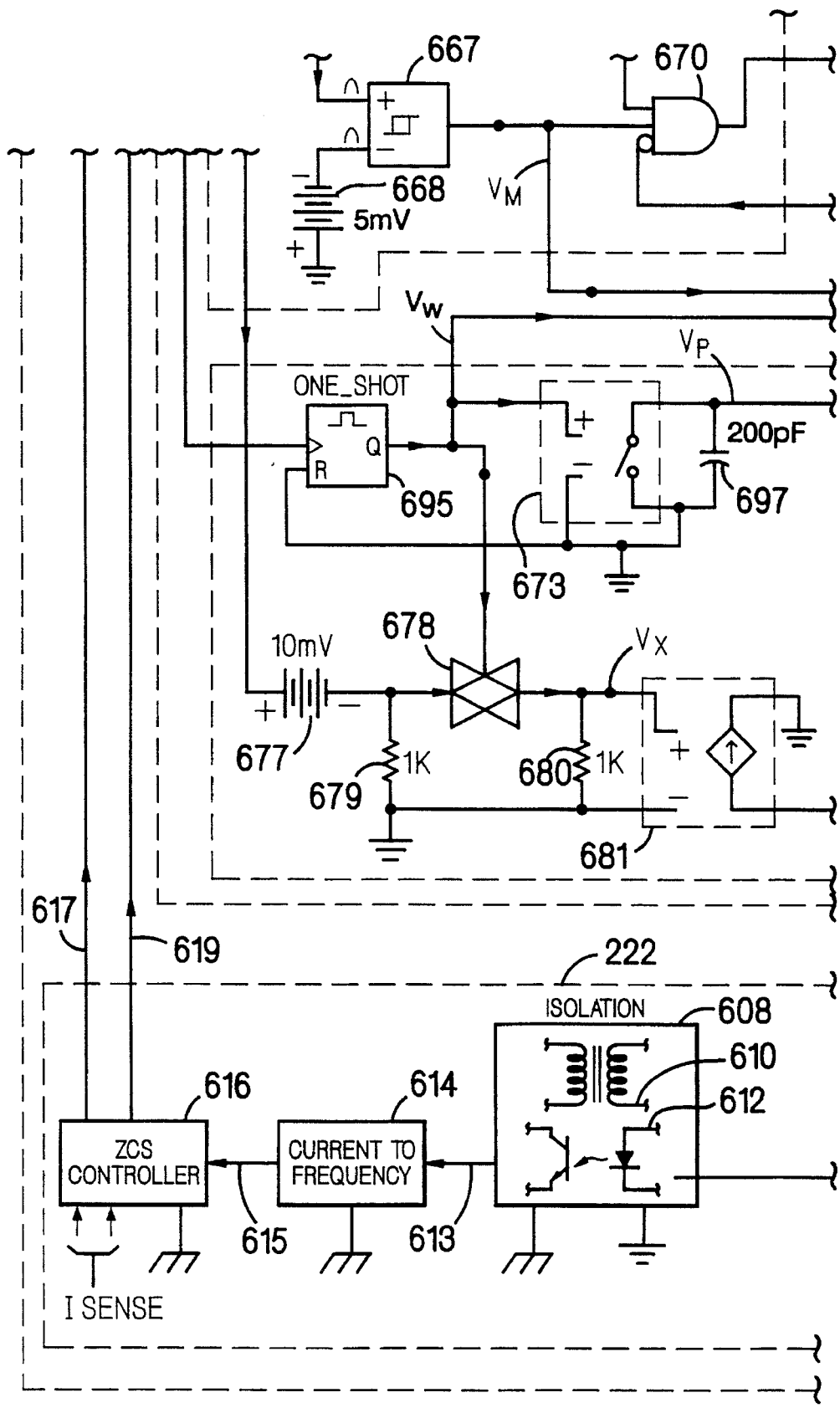
Figure 11D:
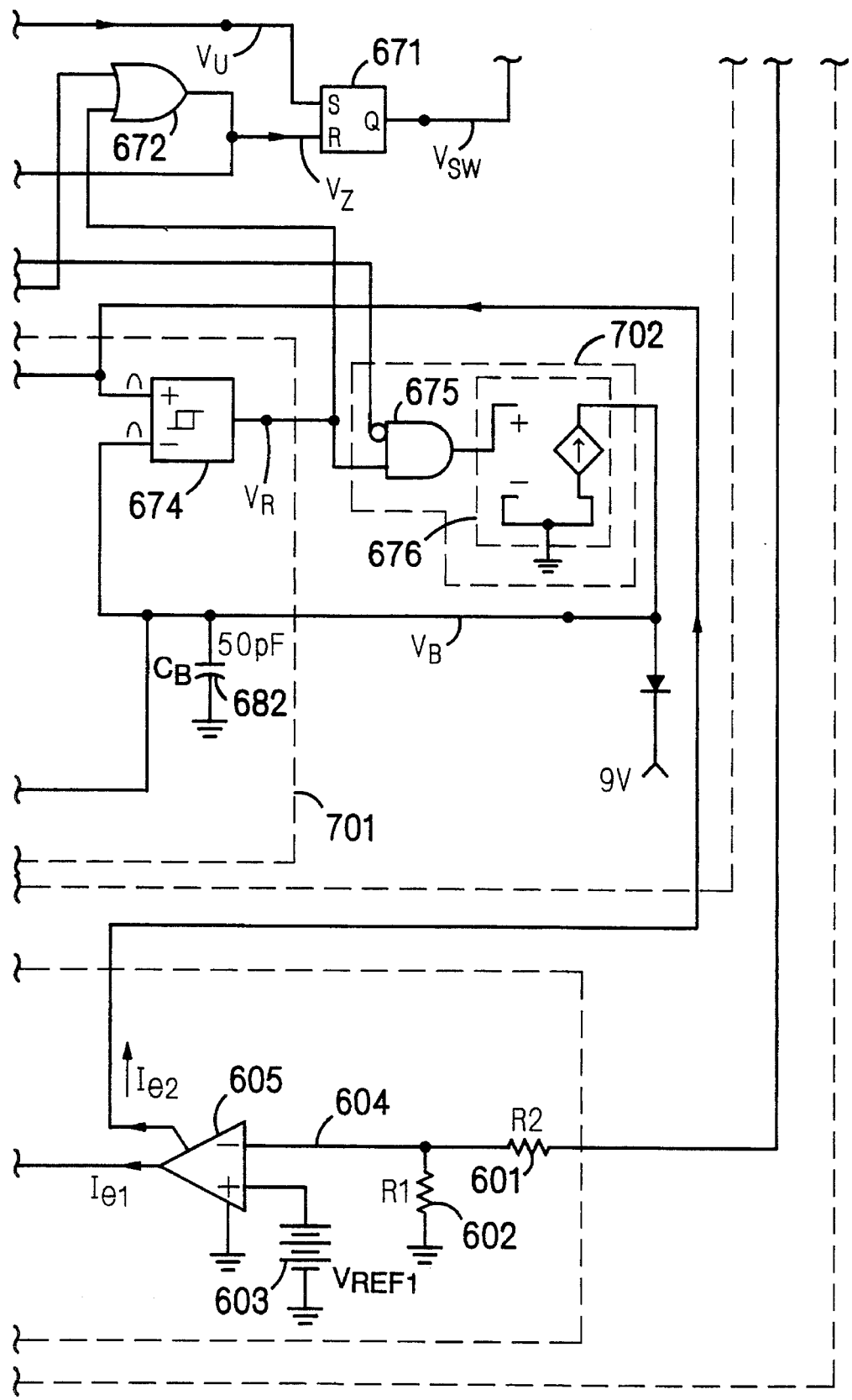
Figure 11E:
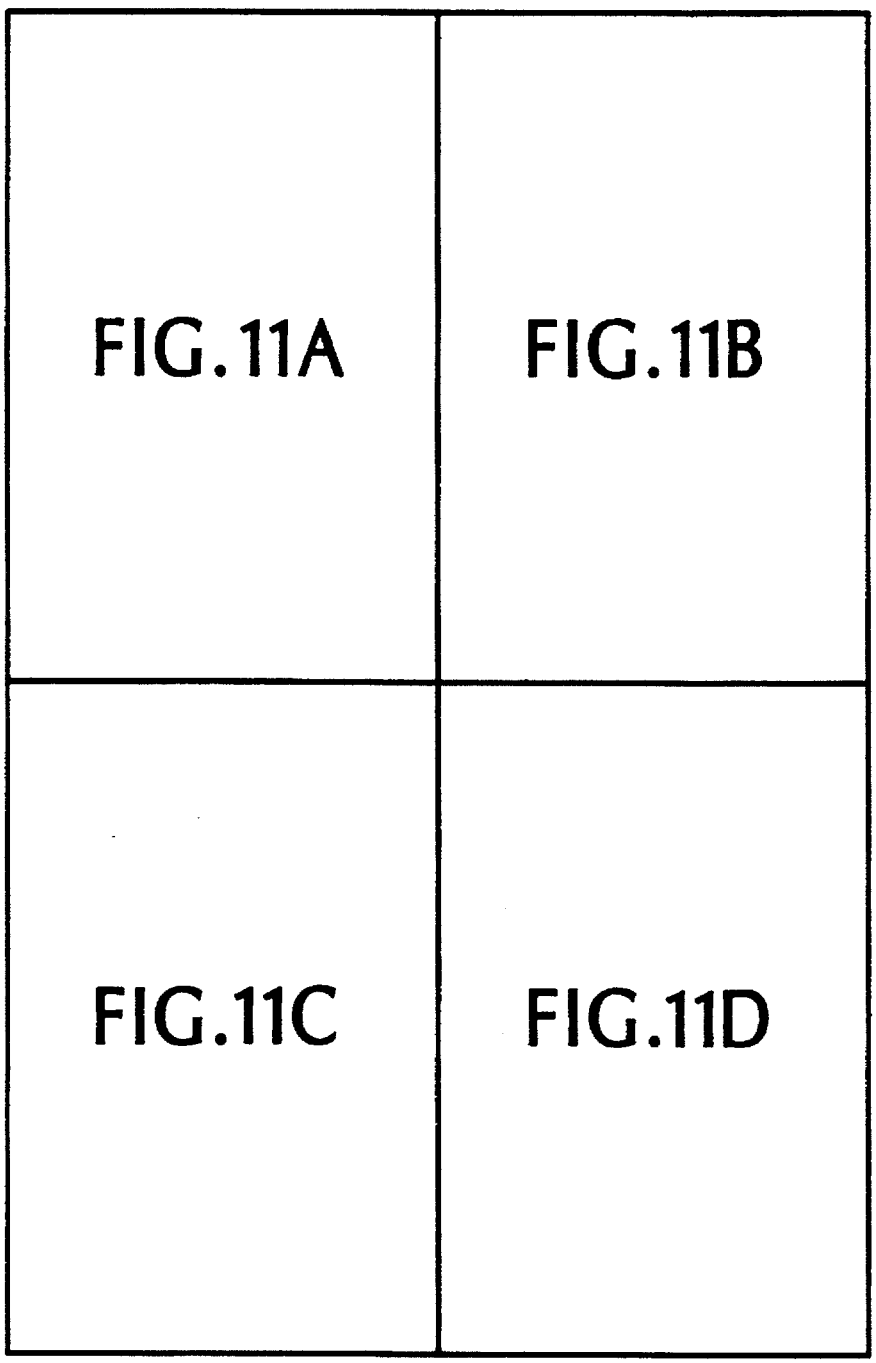

FIGS. 8, 9 and 10 show additional sets of operating waveforms which, when compared with FIG. 7, indicate how the converter responds to further reductions in converter load. In FIGS. 7, 8, 9 and 10, the converter loading is 6.3 Watts, 5.3 Watts, 2.84 Watts and 0.053 Watts, respectively. As load is reduced the value of the reverse current which flows in the output inductor at the time the boost switch is opened (e.g., at time t=tbo) increases; the positive and negative excursions of the current Io throughout the operating cycle become more uniform and symmetrical about the value Io=0; the value of voltage to which the capacitor is precharged prior to the main switch being turned on (e.g., the voltage Vp across the capacitor at time t=tmc) increases toward a value of Vp=Veq; the maximum value of the capacitor voltage, Vc, during the forward energy transfer cycle (i.e., between time t=tmc and t=tmo) declines toward Veq; the maximum value of the forward current, If, declines toward zero; and the energy transferred forward during each cycle declines toward zero. In FIG. 10, which is indicative of operation at very close to zero load conditions, the value of Vp is very nearly equal to Veq (15 Volts); virtually no forward current, If, flows during the time the main switch is closed; and the waveform of the capacitor voltage, Vc, reduces to a sinusoidal voltage variation, having a characteristic time constant To=pi*sqrt(L*C), associated almost entirely with a back and forth transfer of energy from the converter output (e.g., from output capacitor 301 in FIG. 4A) to the capacitor 220 via the output inductor 224. This is also indicated in the waveform for the output inductor current in FIG. 10: the current variation is symmetrical about Io=0, has an average value almost equal to zero and flows essentially entirely between the converter output and the capacitor. Yet, despite the fact that there is no current-limiting impedance in series with the boost switch in the converter of FIG. 4A (as there is, for example, in the converter of FIG. 3 operating in damped reverse boost mode) the peak current in the output inductor at zero load is a relatively modest 3 Amperes. This is substantially less than the values of peak currents which are exhibited in a converter of the kind shown in FIG. 2 operating in reverse boost mode.

FIG. 11 shows a schematic diagram of a DC—DC converter 650 which includes both reverse boost phase controller circuitry 360, suitable for implementing the reverse boost control strategy described above, and control circuits 222 of the kind which turn the main switch 226 on and off (at times of zero current) at a converter operating frequency which is consistent with maintaining the converter output voltage at some predetermined value. For generality, the converter includes primary-to-secondary isolation (i.e., power conversion circuitry includes an isolation transformer, as in FIG. 4A, and any circuitry which is electrically connected to the input voltage source 112 is galvanically isolated from circuitry connected to the load, as indicated by the two different return reference symbols 697, 699 used in FIG. 11) but it should be apparent that the same operating principles would apply to a non-isolated converter (e.g., of the kind shown in FIG. 4B).

In FIG. 11 the converter 650 includes power conversion circuitry which is essentially identical to the corresponding circuitry in the converter 450 of FIG. 4A, consisting of: a leakage inductance transformer 214 having a primary winding with N1 turns, a secondary winding with N2 turns, a turns ratio N=N1/N2, and a secondary-reflected effective leakage inductance of value L2e; a main switch 226; a forward diode 216; a bidirectional switch 228 (embodied as a MOSFET switch 641 and a diode 642, and described below); a capacitor 220, of value C; and an output inductor 224, of value L, where L is large relative to L2e. The converter accepts power from an input voltage source 112, of value Vin, and delivers power to an external load 300 at an output voltage Vout. An output filter capacitor 301 is shown included within the converter 650 and connected across the converter output, but this capacitor may be considered representative of filter capacitance which is either included within the converter 650; which is external to the converter (e.g., part of the load 300); or both. Unless specified otherwise, the discussion and Figures which follow with respect to the operation of the converter of FIG. 11 assume power conversion component values which are the same as those given previously in connection with the description of the waveforms of FIGS. 6 through 10 (i.e., Lle=30 nanoHenry; C=0.44 microFarad; L=4 microHenry; Veq=N1/N2*Vin=15 V; and Vo =5 Volts). Also, the filter capacitor 301, Co, has a value of 450 microFarads and an equivalent series resistance of 13 milliohms (not shown in FIG. 11).

The frequency controller circuitry 222 includes a voltage divider, comprised of resistors 601, 602, connected across the converter output. The voltage divider delivers a signal 604, indicative of the converter output voltage, to one input of error amplifier 605. The error amplifier compares the signal 604 to a reference voltage 603 having a value Vref1 (where Vref1 is indicative of some desired value of converter output voltage). If the signal 604 is greater than Vref1, the error amplifier output current, Ie1, will decrease; if the signal 604 is less than Vref1, the error amplifier output current, Ie1, will increase. The current Ie1 is passed through an isolation barrier 608 (which, as indicated in the Figure, might include magnetic isolation elements 610 or optically-coupled isolation elements 608) and the current output signal from the isolation circuitry 613 is delivered to a current-to-frequency converter 614. An increase in the signal 613 will cause the frequency of the output signal 615 of the current-to-frequency converter to increase and vice versa. The signal 613 is delivered to the ZCS ("zero-current switching") controller 616, which, in turn, delivers two signals: a first signal 617 which is delivered to gate-driver circuitry 623 via gate-driver-transformer 621, and a second signal 619 which is delivered to reset circuitry 625. First signal 617 turns the main switch 226 (which, in the Figure, is embodied as a MOSFET device) on initiating a forward energy transfer cycle. Current in the main switch 226 is sensed by current transformer 627 and the primary current-sense signal, Isense, 629 is delivered back to the ZCS controller 616. When the current in the main switch returns to zero the ZCS controller turns the main switch off. The frequency output signal 615 of the current-to-frequency converter sets the rate at which the main switch is turned on and off. The reset signal 619 turns the reset switch 631 off when the main switch is turned on and turns the reset switch on when the main switch is turned off. By this means, the control circuits adjust the converter operating frequency so as to maintain the converter output voltage at the desired value, Vout. Details of the operation of gate driver circuitry 623 and reset circuitry 631 are described in Vinciarelli, "High Efficiency Floating Gate Driver Circuit Using Leakage Inductance Transformer," U.S. patent application Ser. No. 07/805,474, and in Vinciarelli, "Optimal Resetting of the Transformer's Core in Single Ended Forward Converters," U.S Pat. No. 4,441,146, respectively.

Reverse boost phase controller 360 receives three inputs and delivers one output. The inputs to the phase controller are a current sense signal, Vs; a main switch closure signal Vsc; and an operating frequency signal Ie2. The current sense signal Vs is derived at the junction of a sense capacitor 633 and a sense resistor 635, the series combination of which are connected across capacitor 220. If the values of the sense capacitor 633, Cs, and the sense resistor, Rs, are chosen such that only a small fraction of the time varying voltage, Vc, appears across the sense resistor, then the current in the sense capacitor will be very closely approximated by Cs*dVc/dt and the voltage across the resistor will be Vs=Rs*Cs*dVc/dt. Thus, the current sense signal, Vs, is a voltage which is directly proportional to the rate-of-change of the voltage Vc. For the converter of FIG. 11, the values of Cs and Rs are 530 picoFarads and 10 ohms, respectively. The operating frequency signal Ie2 is a current which is indicative of the operating frequency of the converter. Since the current Ie1 delivered by the error amplifier 605 is indicative of converter operating frequency, the current sense signal Vs is generated by using the error amplifier to deliver another current, Ie2, which is proportional to Ie1. In the converter 650 of FIG. 11, the approximate proportionality constant between Ie2 and the converter operating frequency is 1.4 milliAmpere/Megahertz. The main switch closure signal Vsc is derived via a winding 691 on gate-driver-transformer 621. When the ZCS controller 616 delivers a first signal 617 to turn on the main switch 226, winding 691 reflects this signal into the set input of Set-Reset flip-flop 693 causing the "Q" output of the flip-flop to go high. In response to the high-going transition of the "Q" output of flip-flop 693, the sampling pulse output, Vw, of sampling one-shot 695 will go high for approximately 100 nanoseconds. Thus, each time the main switch 226 is turned on the sampling one-shot produces a sampling pulse, Vw. The flip-flop 693 is reset by a signal VQ which is generated prior to generation of the next first signal 617, as explained below.

The output of the reverse boost phase controller 360 is the reverse boost control signal Vsw. In the converter of FIG. 11, the bidirectional reverse boost switch 228 is embodied as a MOSFET 641 in parallel with a diode 642. When the reverse boost control signal is high, MOSFET 641 is turned on and the MOSFET can conduct current Isw which flows in the direction indicated by the arrow. When the MOSFET is off, the diode 642 can conduct current Isw which flows in a direction opposite to that indicated by the arrow (provided that the capacitor 220 is discharged). Thus, if at the time the capacitor 220 voltage declines to zero the power drawn by the load is sufficient high so that the current, Iout, is flowing in the direction of the load, the diode 642 will smoothly begin to bypass this current around the capacitor 220 (whether or not the MOSFET is turned on). On the other hand, if the MOSFET is turned on and current reversal occurs in the output inductor 224, the MOSFET will conduct the reverse current around the capacitor 220 and prevent the capacitor from charging. If the MOSFET is turned off however (by reverse boost control signal Vsw going low) and reverse current is flowing in the output inductor, the reverse current will flow into, and begin to precharge, the capacitor 220. Unless otherwise specified, the discussion and Figures which follow are for a converter which includes a MOSFET switch 641 having an on-resistance of 10 milliOhms (corresponding to the state-of-the-art in commercially available MOSFET technology at the time that this application was written). This corresponds to an essentially lossless device and produces operating waveforms which vary negligibly from those theoretically predicted for an ideal switch (e.g., one with an on-resistance of 0 ohms).

Operation of the reverse boost phase controller circuitry will be explained with reference FIGS. 12A through 12N which show waveforms of the converter of FIG. 11 operating at a very low value of load power (Vout=5 V DC; $I_L$=5 mA DC; Pload=25 milliWatts). The circuitry consists of three major subcircuits: boost switch turn-on circuitry 700; phase control and boost switch turn-off circuitry 701; and coarse phase control circuitry 702. We begin by observing that, on a cycle-by-cycle basis, the phase controller circuitry 360 does not directly affect the period of the converter operating cycle; the period is always set by the frequency controller 222 as it seeks to maintain the converter output voltage at the desired setpoint value. Over many cycles, the effects of each controller 360, 222 will interact, but during any given operating cycle the frequency controller 222 will set the period of the converter operating cycle (i.e., the time between forward energy transfer cycles) whereas the phase controller circuitry 360 will seek to adjust the time during the cycle at which the boost switch is turned off such that, at low values of load, the voltage, Vc(t), induced across the capacitor 220 by reverse current flow in the output inductor 224, is at a maximum value at the time that the next operating cycle begins (i.e., the time at which a forward energy transfer cycle begins in response to closure of the main switch 226 by the frequency controller 222). It is also to be noted that determining when the capacitor voltage has reached a maximum value can be inferred by measuring the value of dVc(t)/dt when the sinusoidal variation in Vc(t) reaches its maximum value, the value of dVc(t)/dt will be zero.

With reference to FIGS. 11 and 12, a reverse boost switch cycle is shown beginning at time t=t1 with the opening of switch 641 (Vsw goes low, FIG. 12I). Between time t=t1 and t=t2, the reverse flow of output inductor current, Io (FIG. 12C) induces a precharge on the capacitor 220, as shown in the waveform of Vc in FIG. 12B. At time t=t2 the frequency controller 222 initiates a forward energy transfer cycle by closing the main switch 226, resulting in a flow of forward current If (FIG. 12A). Shortly thereafter, the forward energy transfer cycle ends when the current If returns to zero and the frequency controller 222 turns off the main switch 226. Since the waveforms in FIG. 12 are for Steady state operation at a very small value of load, the controlled timing of the opening of the boost switch results in a precharge on the capacitor 220, at time t=t2, Which is very close to the value of Veq (15 Volts). As discussed above, the precharge restrains the flow of forward current, If, and the effect of this restrained forward energy transfer is barely discernible at the peak of the voltage waveform across the capacitor 220 (FIG. 12B). Between t=t3 and t=t4, energy from the capacitor 220 flows toward the converter output, Io is positive and Vc declines. Just prior to time t=t4 the voltage Vc returns to zero and the diode 642 begins to conduct, bypassing the positive flow of current Io around the capacitor. At time t=t4 the switch 641 is turned on (FIG. 12I) in preparation for a subsequent reversal in the current Io. It is useful to note that, between time t=t1 and t=t4, when the switch 641 is opened and the diode 642 is reverse biased and non-conducting (i.e., the bidirectional switch 228 is not conducting), the current in the capacitor 220 is equal to Ic =If–Io. Referring to FIGS. 12A, 12C and 12D (which show the waveforms for If, Io and Vs, respectively), and to the discussion above regarding the purpose of the sense capacitor 633 and the sense resistor 635, it can be seen that the waveform of the voltage Vs during this time period accurately reflects the waveform of the current Ic.

The switch 641 is turned on by boost switch turn-on circuitry 700 when the capacitor 220 voltage Vc returns to zero (time t=t4), which is determined on the basis of the logical combination of two events. One of these events, the decline of Vc to a value near zero, is derived from the output of a clamped integrating amplifier circuit comprised of operational amplifier 660, integrating capacitor 661, resistor 662, voltage source 663, diode 664, and bias voltage source 666. The input to the clamped integrating amplifier is the signal Vs. Since Vs is an accurate reconstruction of dVc/dt, integration of Vs will produce a waveform which closely reconstructs Vc. In operation, the 5 mV bias source at the positive input of the operational amplifier 660 causes the output of the integrator, Vt, to be biased up to a positive voltage value which, due to the clamping action of the voltage source 663 and the diode 664, will assume a value which results in a 5 mV signal being present at the negative input of the operational amplifier (the approximate value of Vt will be around 8.6 Volts). The presence of this voltage across the 9.9K resistor 662 and the 100 ohm resistor 635 will result in a current, Ix, flowing in the input of transconductance amplifier 665 of approximately 0.5 microAmpere. The transconductance amplifier will amplify this by a factor of 2,000,000 Volts/ampere resulting in a voltage, VQ, at the transconductance amplifier output, of 1 Volt. Between time t=t1 and t=t4 the voltage Vs appears at the input of the clamped integrating amplifier. As shown in FIGS. 12D, 12E and 12F, the initial presence of positive Vs will cause the output of the clamped integrating amplifier, Vt, to begin to integrate down, and, between t=t1 and t=t4, the output of the clamped integrating amplifier (FIG. 12E) is seen to follow the approximate shape of Vc (FIG. 12B). During the time that the amplifier is integrating, the current Ix returns to zero (since Vt is below the value of the voltage source 663), and the voltage VQ drops to zero (FIG. 12F). Since the integral of Vs should be essentially zero (due to the absence of average current in the sense capacitor 633), the integration of Vs would ordinarily be expected to result in the voltage Vt returning to its clamped value at essentially the same time that Vs returns to zero (at time t=t4). However, the effect of the 5 mV bias source 666 results in the voltage Vt returning to the clamped state at time t=tc (FIG. 12F), prior to t=t4. This causes current Ix to flow at the transconductance amplifier 665 input, forcing the voltage VQ to go high and enabling one input of AND gate 670 (it is to be noted that all logic elements in FIG. 11 have a nominal 0.5 V threshold: a logical "high" is asserted by voltages above 0.5 Volt; a logical low is asserted by voltages below 0.5 Volt). Another input of the AND gate 670 receives a signal, Vm, which is the output of comparator 667. One input to comparator 667 is the signal Vs; the other input is a –5 mV reference source 668. Thus, as shown in FIG. 12G, the output of comparator 667, Vm, goes logically high whenever Vs is more positive than –5 mV. Provided that the remaining, inverting, input of the AND gate 670 is not logically low (discussed below), the output of the gate 670 will go high at time t4, when both the signal VQ and the signal Vm are logically high. This sets the Set-Reset flip-flop 671, resulting in the signal Vsw going high and turn-on of switch 641.

Fine control of the point in time at which the switch 641 is turned off is performed by phase control and boost switch turn-off circuitry 701. This circuitry seeks to adjust the phasing of the switch turn-off within each operating cycle so that, at light loads (for which current reversal occurs) the next forward energy transfer cycle will occur when the voltage Vc (resulting from reverse current precharging of capacitor 220) has reached a maximum. As noted earlier, since the variation of voltage across the capacitor resulting from reverse current flow is sinusoidal, the value of dVc/dt will be zero when Vc is at a maximum value. Once again the signal Vs is used; in this case because it accurately represents the value of dVc/dt. Neglecting the 10 mV bias source 677 for the moment, the signal Vs is brought into the input of an analog switch 678. The analog switch is turned on each time that the output, Vw, of one-shot 695 goes logically high, which, as previously explained, occurs for 100 nanoseconds each time the main switch 226 is turned on (e.g., at time t=t2 in FIG. 12J). Thus, the output of the analog switch is a series of 100 nanosecond pulses having a peak value equal to the value of dVc/dt at the time that a forward energy transfer cycle occurs. The signal Vx is fed to a voltage-to-current converter 681 (having a gain equal to 1 milliAmpere/ Volt) which generates a series of 100 nanosecond wide current pulses which are also proportional to the value of dVc/dt and which are delivered to reference capacitor 682 (of value 50 picoFarads). Therefore, if the value of dVc/dt at the time that a forward energy transfer cycle occurs is negative (e.g., past the peak of Vc), then the voltage-to-current converter 681 will deliver a quanta of charge (in an amount proportional to dVc/dt) to the reference capacitor and the voltage, VB, across reference capacitor 682, will increase. On the other hand, if the value of dVc/dt at the time that a forward energy transfer cycle occurs is positive (e.g., before the peak of Vc), then the voltage-to-current converter will withdraw a quanta of charge (in an amount proportional to dVc/dt) from the reference capacitor and the voltage, VB, across reference capacitor 682, will decrease. The voltage VB is delivered to one input of comparator 674. The other input of the comparator 674 receives a voltage Vp developed across ramp capacitor 697 (of value 200 picoFarads). The voltage Vp (FIG. 12L) results from the flow of the current Ie2 into the capacitor 697. As previously explained, the current Ie2 is approximately proportional to the converter operating frequency so that the variation in Vp throughout an operating cycle is approximately constant and independent of operating frequency. The ramp capacitor is discharged each time the main switch closes, via one-shot 695 and controlled switch 673, and, as shown in FIG. 12L, this results in initiation of a new ramp capacitor charge cycle during each converter operating cycle. The voltage Vp is compared to the voltage VB (both voltages being shown in FIG. 12L): when Vp exceeds VB, the output of comparator 674, Vr (FIG. 12M), goes high and resets flip-flop 671 via the output, Vz (FIG. 12N), of OR gate 672. This causes Vsw to go low (at time t=t1, FIG. 12I) and switch 641 to turn off.

Assume for the moment that the voltage Vb is at a value such that the comparator 674 turns the switch 641 off too soon. This will increase the time span over which the flow of reverse current will charge the capacitor 220 and will result in dVc/dt being negative (i.e., past the point in time at which the peak value of Vc occurs) when the next forward energy transfer cycle occurs. As a result, the value of Vx will be negative, VB will be incremented, and the point in time at which the switch is turned off during the next operating cycle will occur later. Similarly, if the comparator turns the switch off too late, the next energy transfer cycle will occur when dVc/dt is positive (i.e., before the voltage Vc reaches its peak value); Vx will also be positive; the value of VB will be decremented; and the point in time at which the switch is turned off during the next operating cycle will occur earlier. By this process, the timing of the opening of the switch 641 is controlled to occur at a point in time during the cycle, prior to the initiation of a forward energy transfer cycle, such that the initiation of the forward energy transfer cycle occurs when Vc is at a maximum (at low values of load for which current reversal occurs). Under steady-state conditions this results in a stable value of VB, since the value of dVc/dt at the time that the forward energy transfer begins, and hence both the value of Vx and the amount of charge delivered to capacitor 682, will be zero under these conditions. This is illustrated in FIG. 12E, which shows that the value of the voltage Vx is zero under steady state conditions, as well as in FIG. 12L, which shows a stable and unchanging value of VB.

In the discussion above, the effect of the 10 mV bias source 677 was temporarily neglected. In operation, the effect of the source 677 is to slightly delay the turn off of the switch 641. It has this effect because, under steady state conditions, control action will seeks to maintain Vx at a value of zero volts. Without the 10 mV source 677 in the circuit, this occurs when the values of Vs is zero (corresponding to dVc/dt=0); with the 10 mV bias source 677 in the circuit it occurs when Vs is 10 mV, a small positive value indicative of positive dVc/dt. The result is that initiation of each forward energy transfer cycle will actually begin just prior to Vc reaching its maximum value. This compensates for the finite duration of the energy transfer interval (e.g., time period t2 to t3, FIG. 12A) and tends to align the peak of the flow of current If (FIG. 12A) with the peak of the voltage Vc (FIG. 2B).

Figure 13:
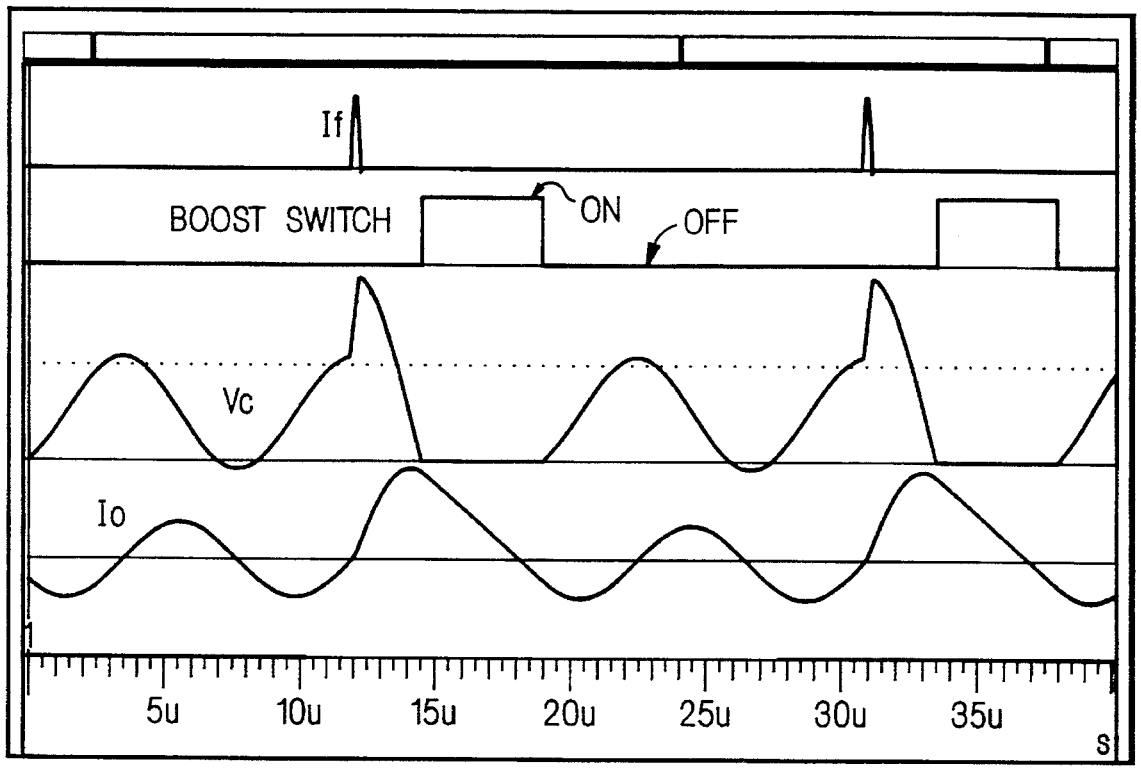
FIG. 13 shows an alternate operating mode which is avoided by means of circuitry included in the converter of FIG. 11.

The remainder of the reverse boost phase controller 360 provides for predictable and proper converter operation under various load conditions and also prevents undesirable operating modes. For example, the signal Vw, generated by one-shot 695 each time that a forward energy transfer cycle is initiated, is delivered to an input of OR gate 672. This ensures that there can be no circumstance under which switch 641 will remain on if main switch 226 is closed. Coarse phase control circuitry 702, ensures that opening of switch 641 occurs at a point in time in the operating cycle (at low values of load for which current reversal in the output inductor occurs) such that the subsequent initiation of a forward energy transfer cycle will occur at the first incidence of a maximum in the value of Vc following the opening of switch 641. This is to prevent the possibility of the converter stabilizing in an alternate operating mode—for example, one in which switch 641 is opened too early allowing the resonance between the output inductor 224 and the capacitor 220 to reach a second peak before the energy transfer cycle occurs. FIG. 13 shows waveforms for the converter of FIG. 11 operating in just such an operating mode at a load of 3 Watts. In the Figure, the boost switch 641 is turned off so much in advance of the closure of the main switch 226 that the initiation of forward energy transfer cycles occur at the second peak of the resonating Vc waveform. Similar stable operating modes can occur on the third, or later, peaks of the Vc waveform. Although these operating modes are stable in the steady state, it is undesirable to allow for their possibility since converter operating frequency at light loads would become unpredictable. Coarse phase control circuitry 702 prevents the converter from stabilizing in one of these alternate modes by sensing whether dVc/dt (measured using the signal Vs) goes negative during the time period between the opening of the boost switch and subsequent initiation of a forward energy transfer cycle. The presence of this condition implies that Vc has passed its first maximum without a forward energy transfer cycle having occurred. AND gate 675 is used to sense whether this has occurred: the output of the gate 675 will go high if the signal Vr is logically high and the signal Vm is logically low. As described earlier, Vr being high indicates that the boost switch has been opened and that the main switch has not yet been closed (since closure of the main switch causes controlled switch 673 to close, discharging ramp Capacitor 697, and causing Vr to go low); Vm being low indicates that Vs (i.e., dVc/dt) is negative. When the combination of these logical conditions occurs, indicating that closure of the main switch has not occurred but that Vc has gone past its first maximum, the output of AND gate 675 goes high and the voltage-to-current converter 676 delivers a 50 microAmpere current into capacitor 682 until such time as the main switch does turn on (bringing Vr low). This forces the voltage VB higher, retarding the turn on of the switch 641 during the next operating cycle. By this means, steady-state operation is forced to converge on an operating point corresponding to the first maximum reached by the voltage Vc following the opening of switch 641.

The waveforms of FIG. 12 are for a converter operating at essentially zero load. As converter loading is increased above zero load, the negative excursion of Io will decrease and the phase controller 360 will adjust the phase of the opening of switch 641 to occur (in advance of the closure of main switch 226) at times which correspond to decreasing values of reverse current Io. This, in turn, reduces the peak value of the voltage to which the capacitor 220 is precharged at the time that a forward energy transfer cycle is initiated and allows increased energy transfer during each operating cycle. This can be seen in FIGS. 10, 9, 8 and 7, which show operating waveforms for power levels of 0.053, 2.84, 5.3 and 6.3 Watts, respectively. As the load is increased the (negative) value of Io at the time that the boost switch opens (time t=tbo) declines toward zero. If the converter load is raised above some value, Pamax (approximately 6.3 Watts for the converter of FIGS. 11 and 12), the phase controller will try to advance the phasing of the opening of the switch 641 still further, but this will cause the switch to open at times of forward current flow of Io (i.e., Io is flowing in a direction toward the load 300). The diode 642 (FIG. 11), however, sets an upper limit on the control range of the phase controller 360. If the switch is opened at a time when positive Io is flowing, the diode 642 will prevent charging of the capacitor 220 until reversal in Io subsequently occurs. Thus, the phase controller asserts control over the amount of energy transferred forward only so long as the opening of the switch 641 occurs when there is reverse flow of the current Io. This operating mode of the converter, during which the phase controller asserts active control over the amount of energy transferred forward during each operating cycle, is called the anticipatory reverse boost mode of operation.

Figure 14:
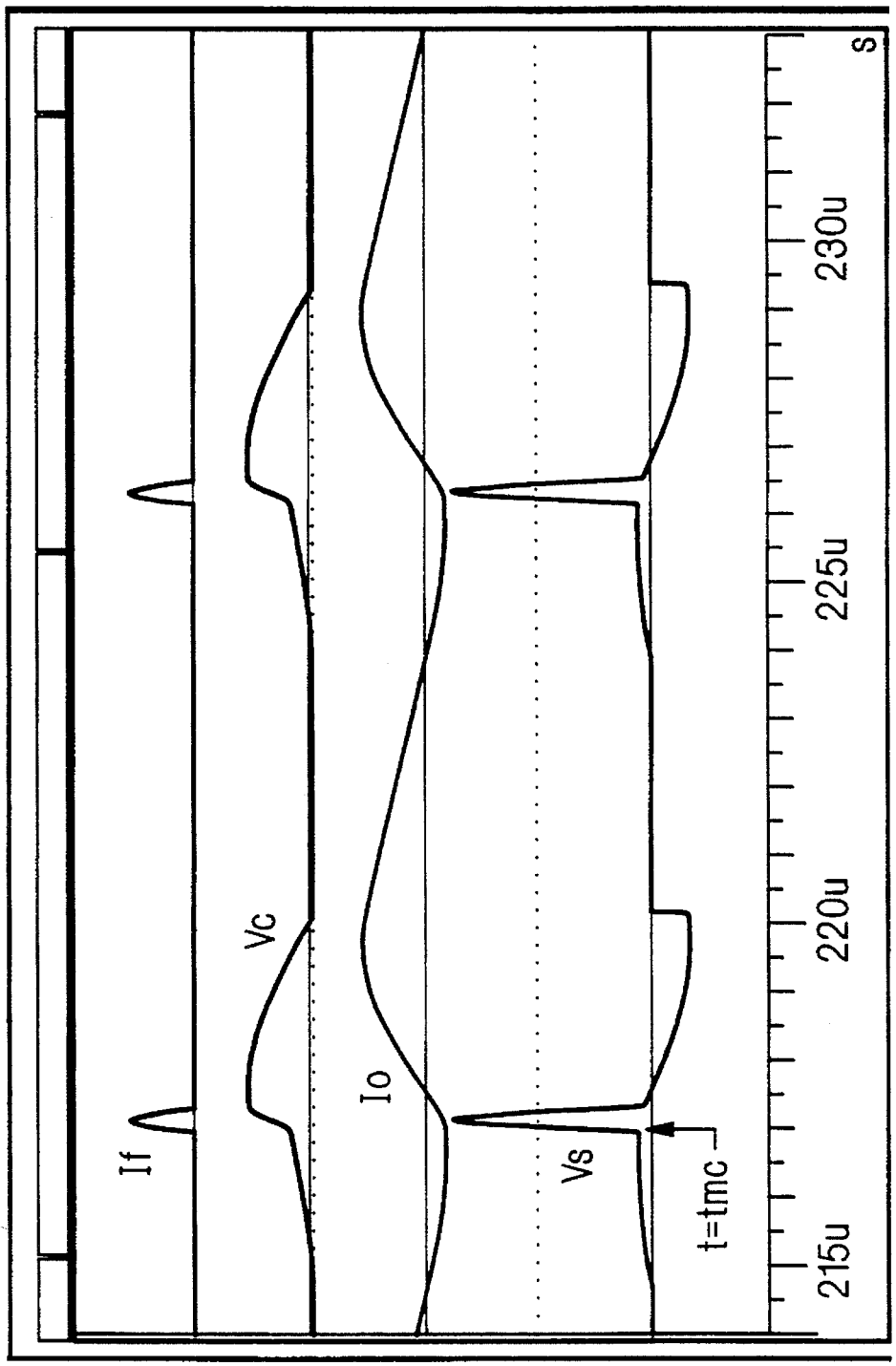
FIGS. 14–16 show operating waveforms for the converter of FIG. 11 under various load conditions.
Figure 15:
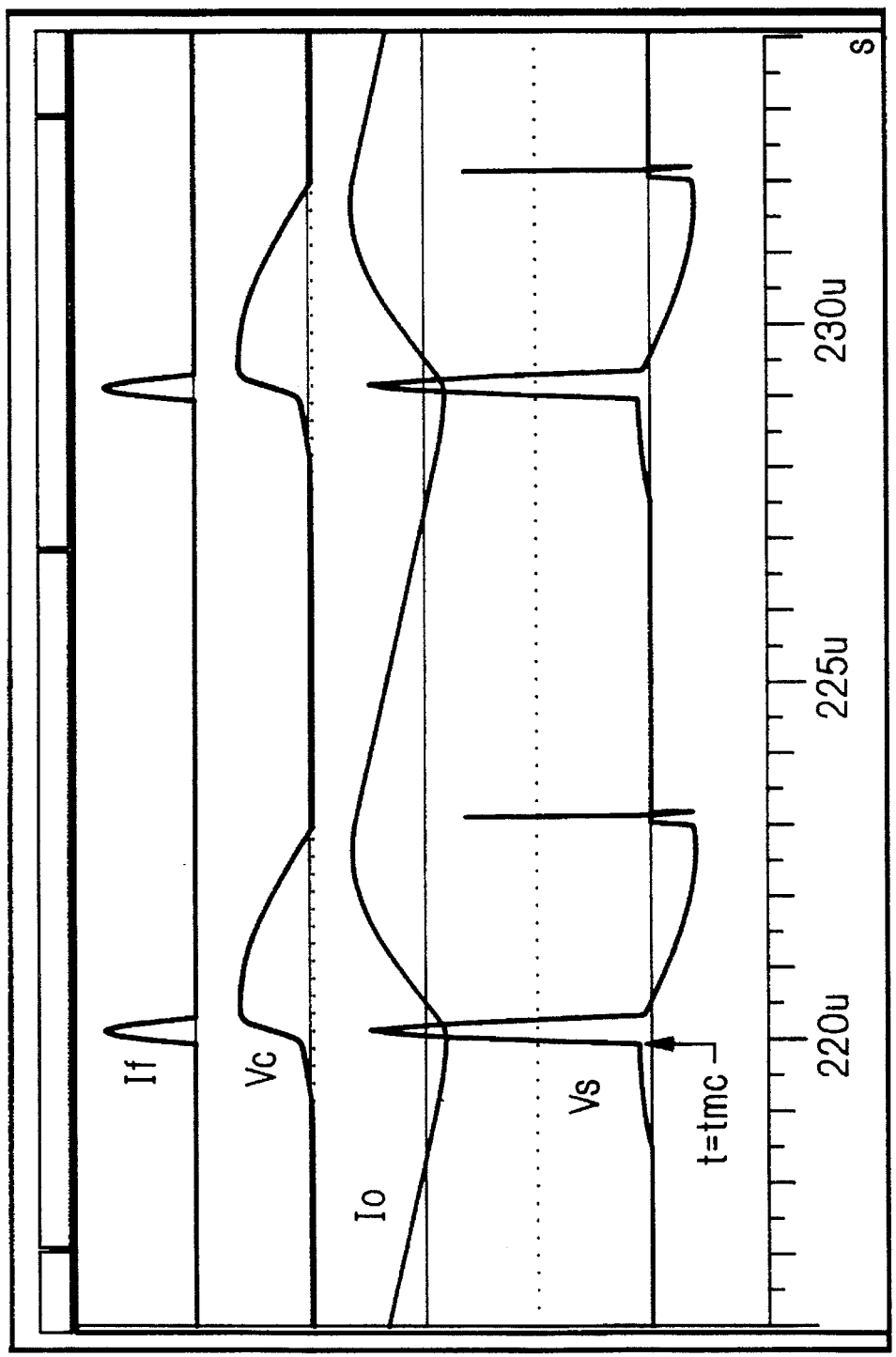
Figure 16:
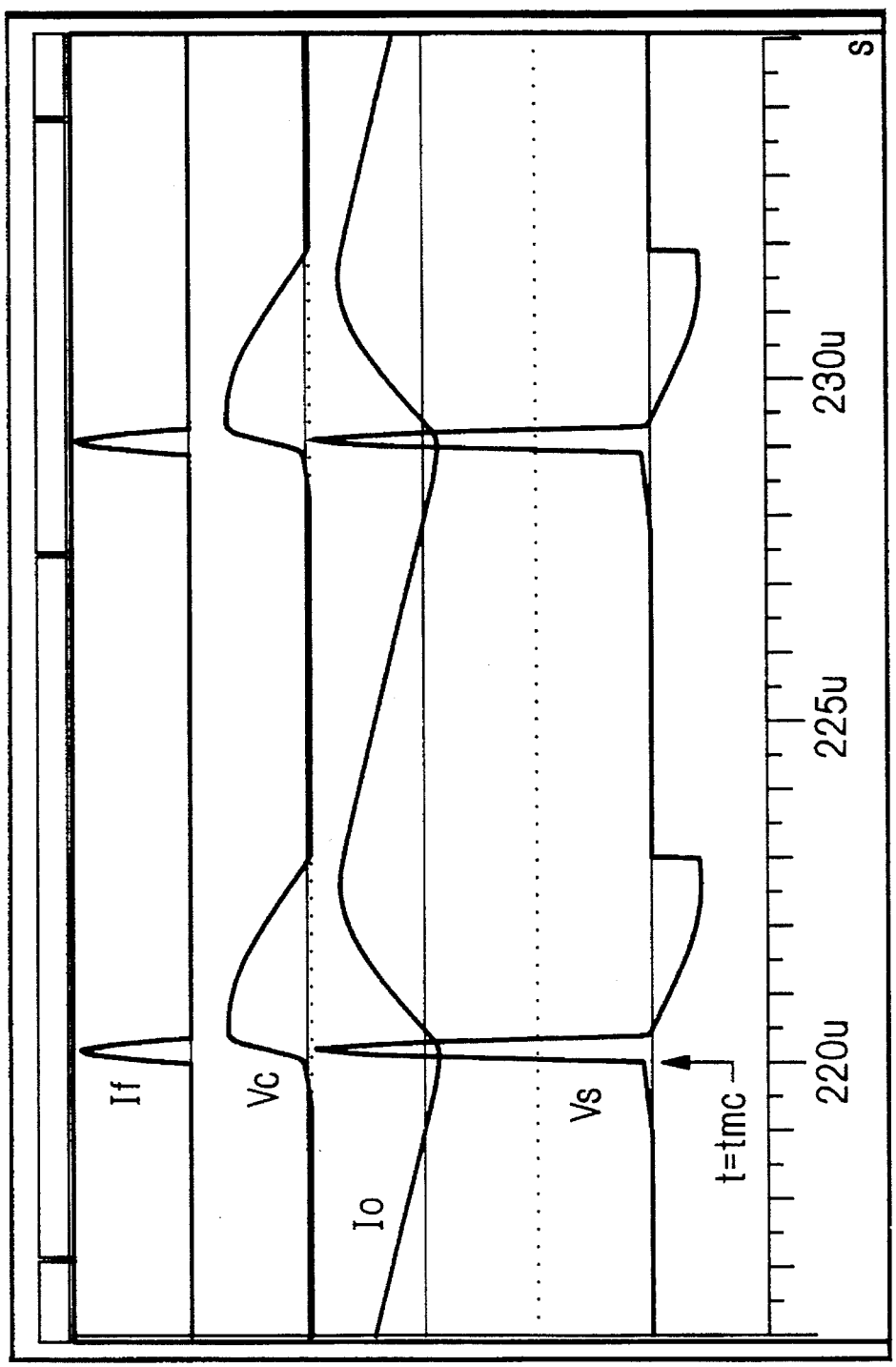

Above the value of load, Pamax, for which anticipatory reverse boost becomes inactive, the converter has two other distinct operating modes. In one mode, previously described, the load is at or above some value, Pnmax, such that current reversal never occurs in the output inductor (e.g., as shown in FIG. 6, for a load of 22 Watts). In this mode there is no reverse boost action whatsoever, there is no precharge on the capacitor 220 to impede forward energy transfer, and converter operating frequency varies approximately linearly with converter load. In a third operating mode, which is active for load values which lie between Pamax and Pnmax, anticipatory reverse boost is inactive but current reversal still occurs during a portion of the operating cycle. In this mode, illustrated in FIGS. 14, 15 and 16 (for the converter of FIG. 11 operating at loads of 8.3, 12.5 and 15.6 Watts, respectively), the times of initiation of forward energy transfer cycles (i.e., times t=tmc) occur prior to the time at which Vc would have otherwise reached a maximum (in response to the reverse flow of current Io). At these times, the slope of Vc (as indicated by the value of the voltage Vs) has not declined to zero but is still positive. As load increases from Pamax to Pnmax the initiation of forward energy transfer cycles advances from occurring at the peak of Vc (at Pamax) to occurring at Vc=0. This phasing occurs automatically and naturally with use of frequency control alone. This operating mode will be referred to as the transition mode.

Figure 17A:
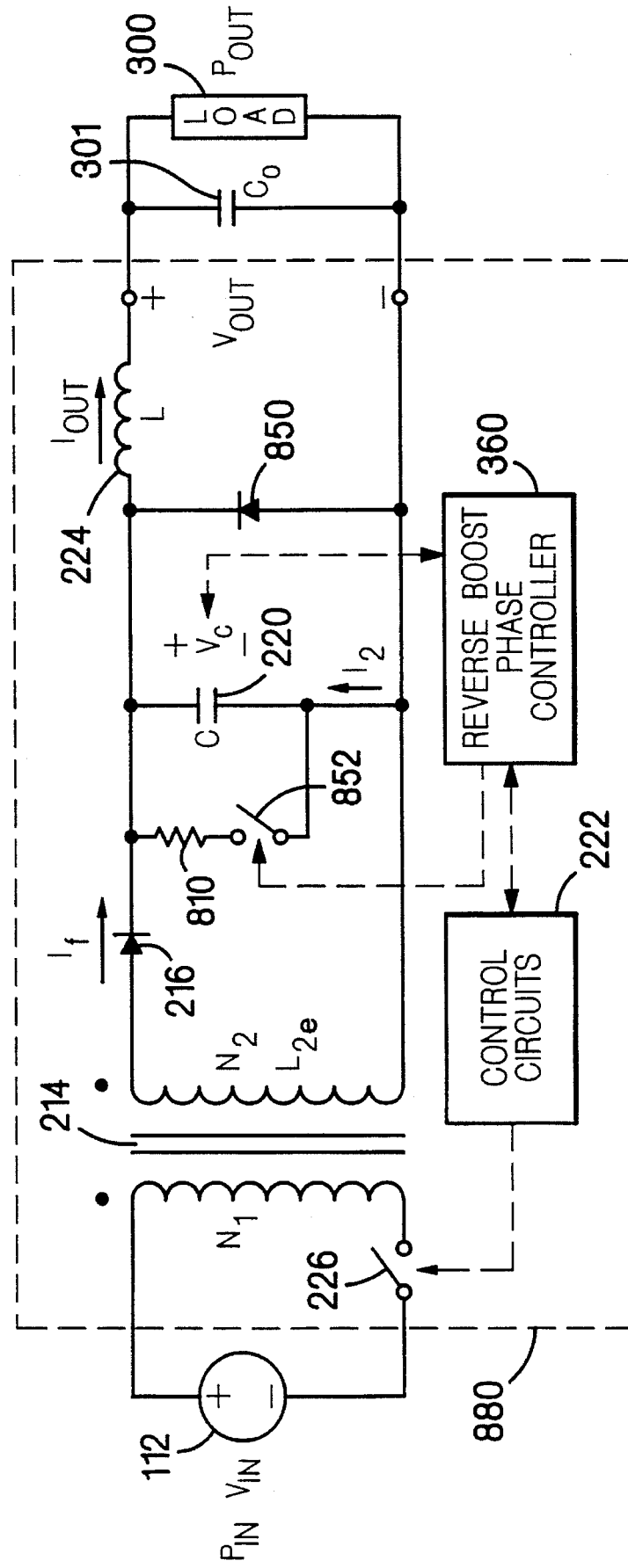
FIGS. 17A and 17B show schematic diagrams for isolated and non-isolated embodiments of a zero-current switching DC—DC converter which includes a controller for operating the converter in a damped anticipatory reverse boost mode of operation.
Figure 17B:
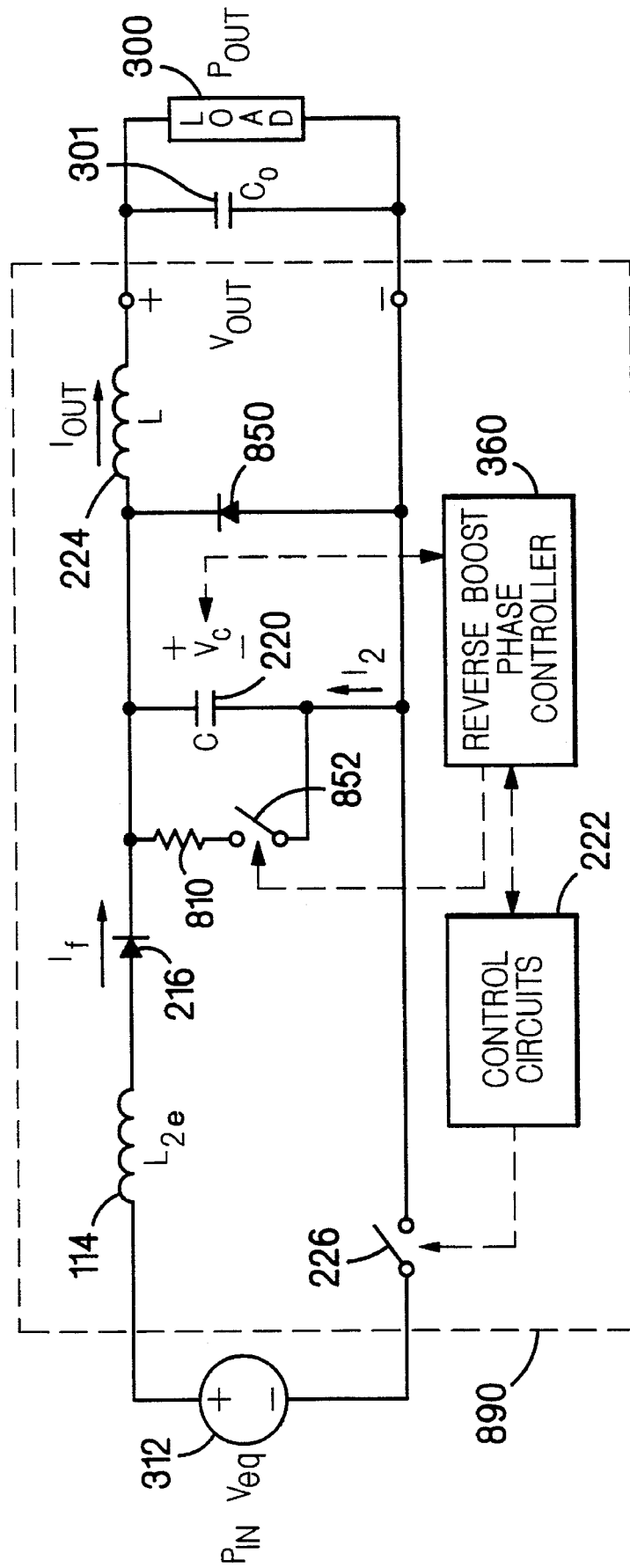
Figure 18A:
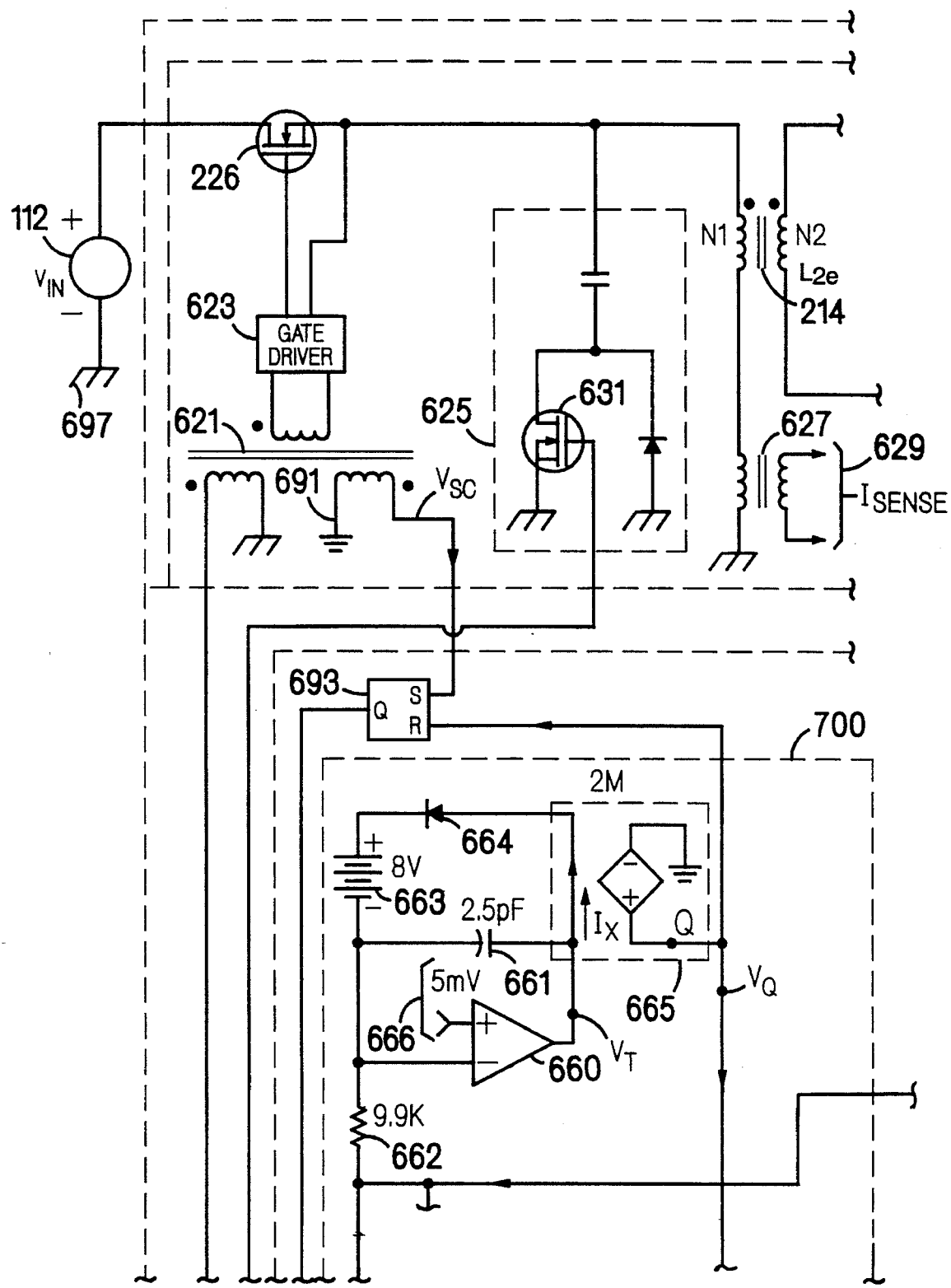
FIG. 18 shows a schematic diagram of an embodiment of a damped anticipatory reverse boost DC—DC converter which includes a schematic diagram of a reverse boost phase controller.
Figure 18B:
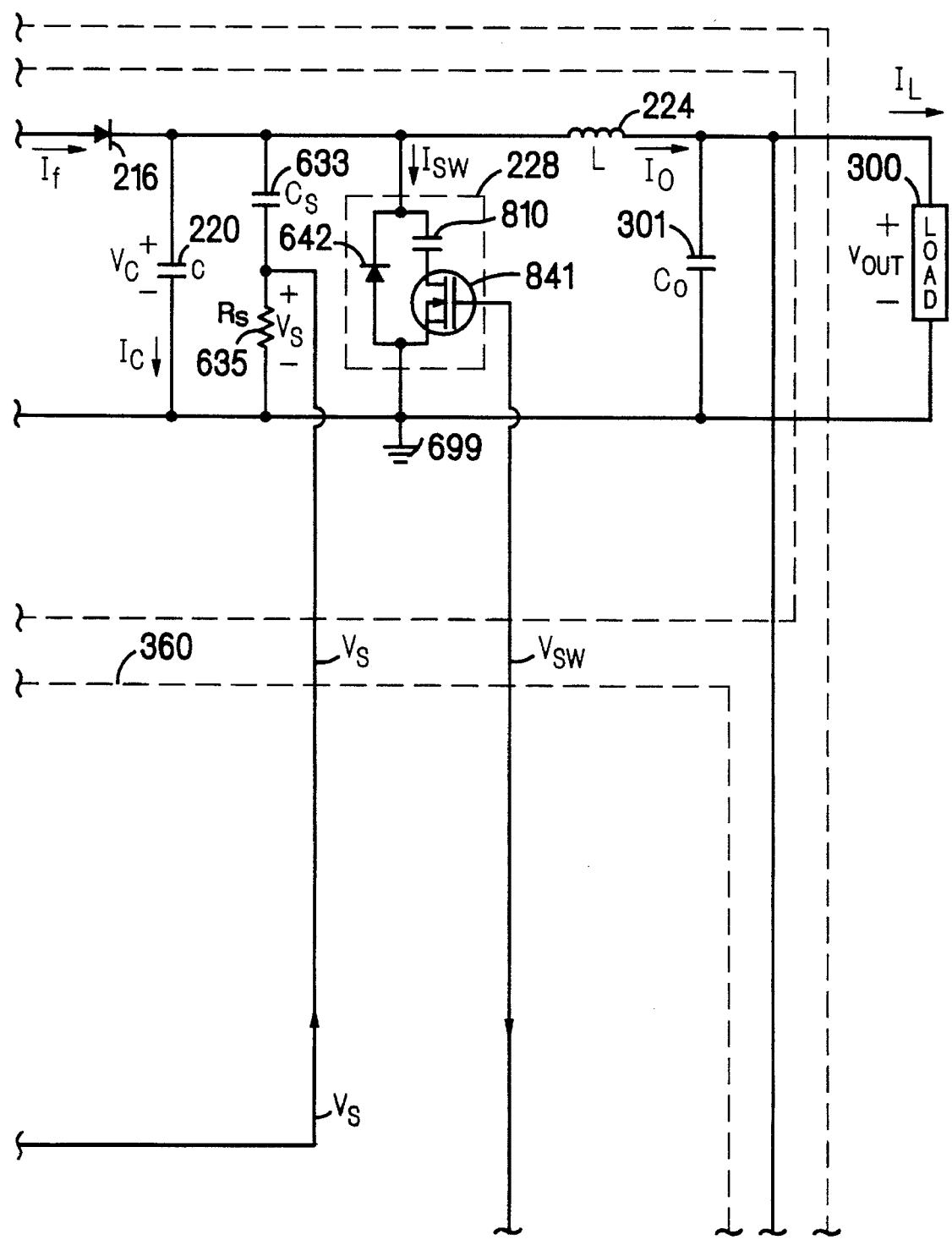
Figure 18C:
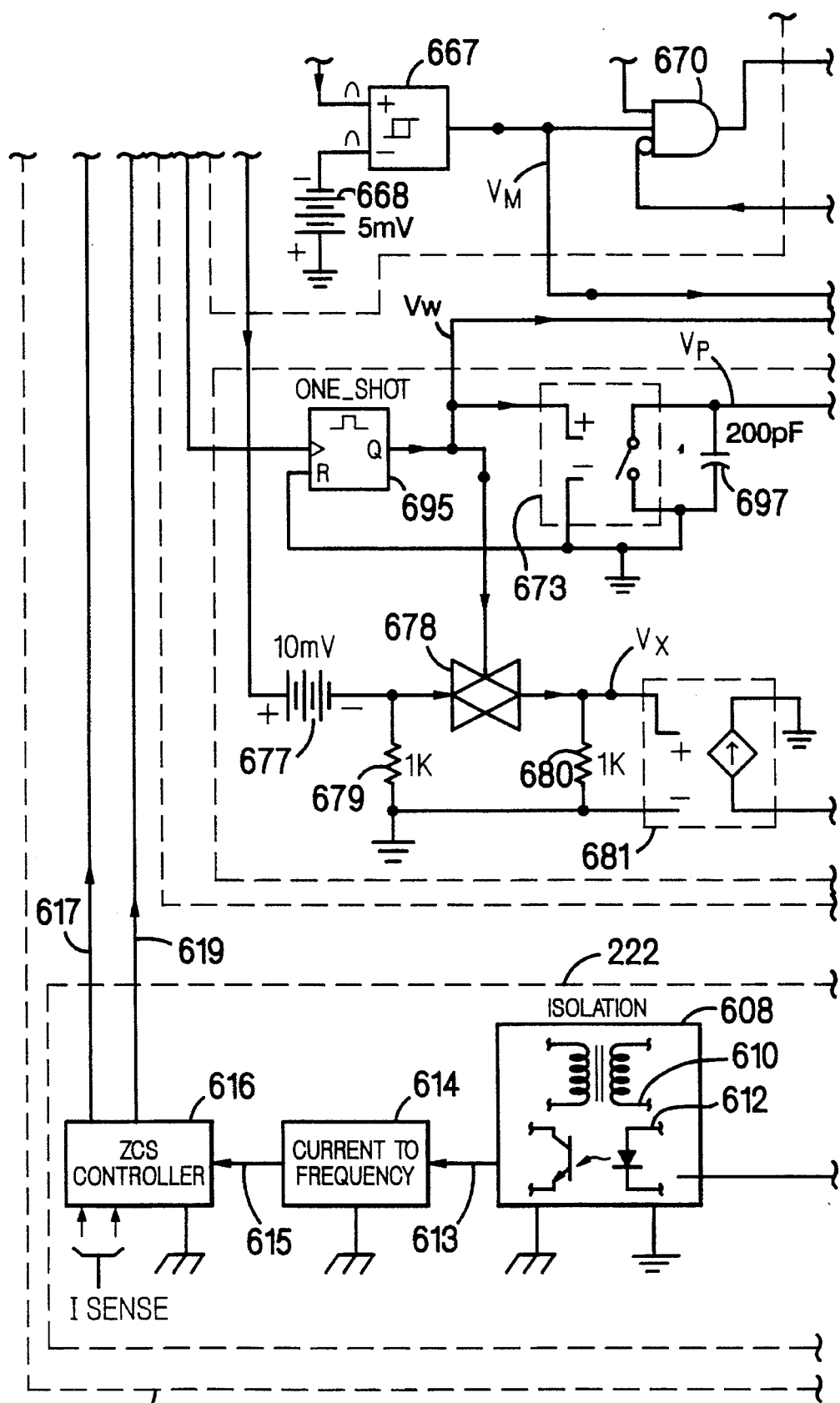
Figure 18D:
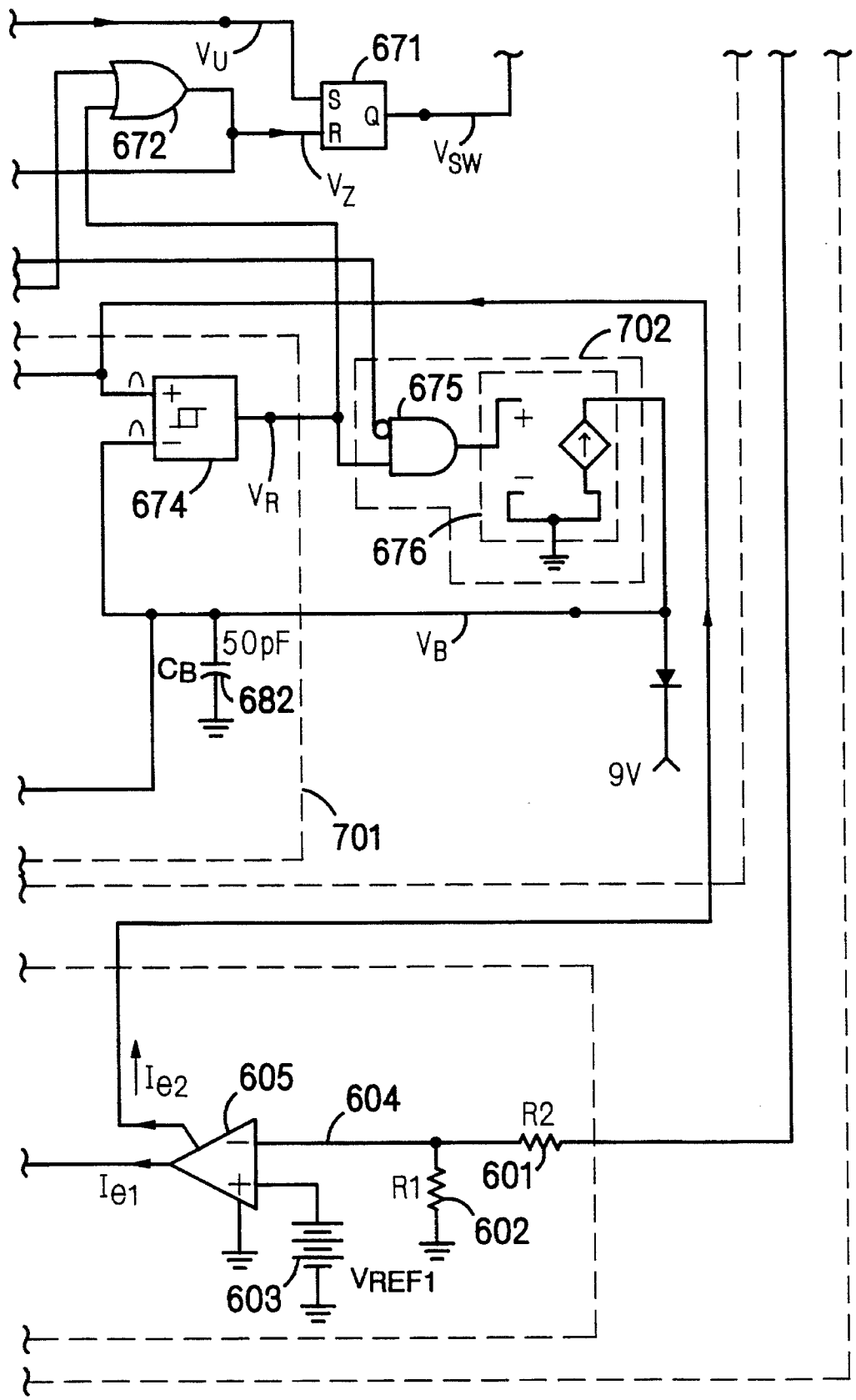
Figure 18E:
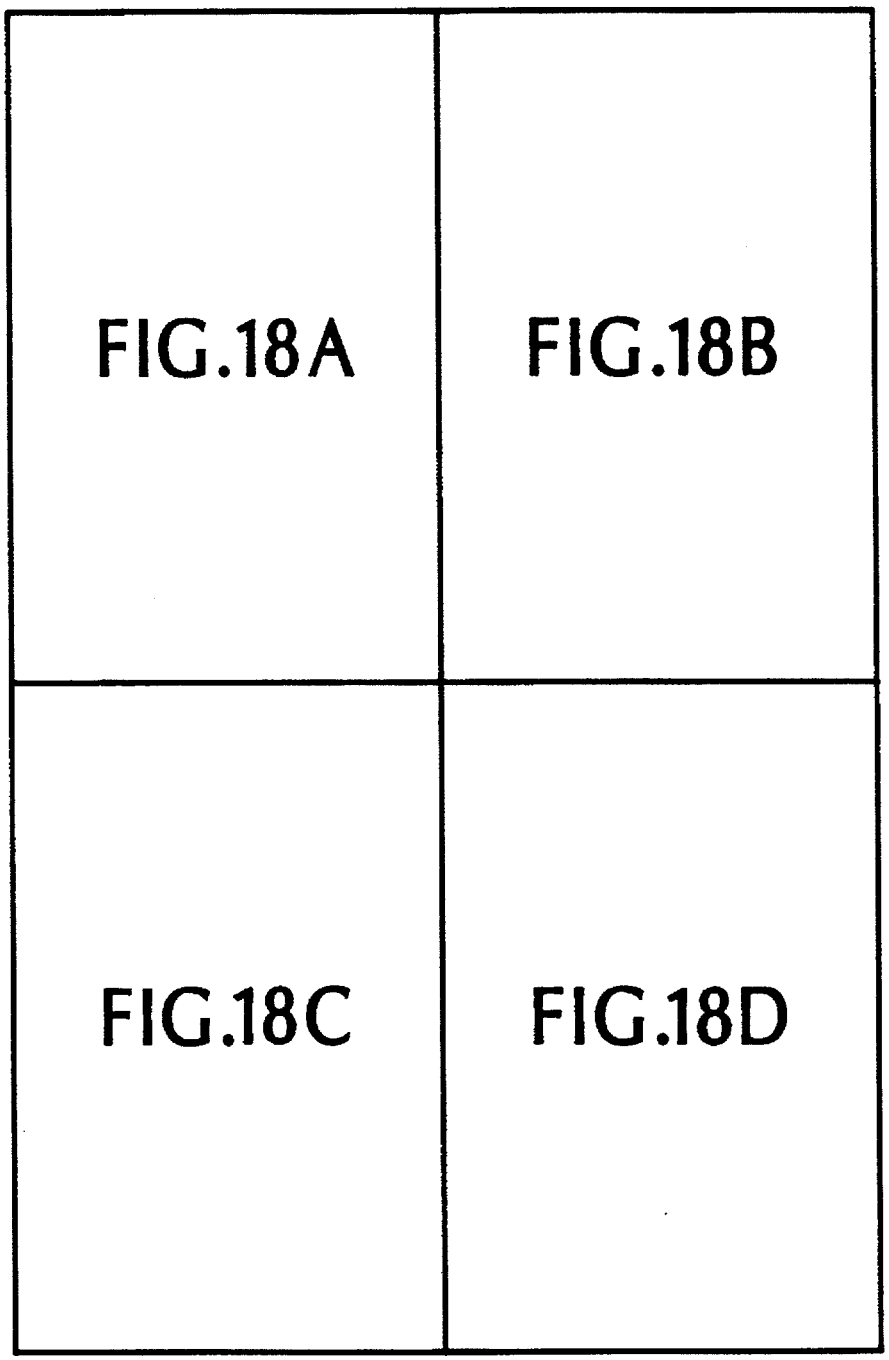

In the preceding discussion, the benefits of anticipatory reverse boost have been described within the context of a converter embodiment which incorporates an essentially lossless switch 641. In another important class of converter embodiments, shown in FIGS. 17A and 17B, the switch 852 is not lossless, but has a finite value of on-resistance 810. In practice, the resistance 810 may comprise the inherent on-resistance of the switch 852, it may be a discrete resistor in series with a switch 852, or it may be a combination of both. While the structure of the power conversion elements in the converters 880, 890 of FIGS. 17A and 17B is comparable to the structure of the power conversion elements in the prior art (damped reverse boost) converter 150 of FIG. 3, the converters of FIGS. 17A and 17B incorporate a reverse boost phase controller 360 instead of the reverse boost controller 32 used in the converter 150 of FIG. 3. Operation of such a converter will be described with reference to FIG. 18 which shows a converter 860 identical in every respect to the converter of FIG. 11 except that the switch 641 of FIG. 11 has been replaced with a switch 841 connected in series with a resistance 810 of value R (representative of the combined values of the discrete resistor 810 and the on-resistance of the switch 841). Component values for the converter of FIG. 18 are the same as those described earlier for the converter of FIG. 11 and the value of the additional resistance 810 is R=1 ohm.

Figure 19:
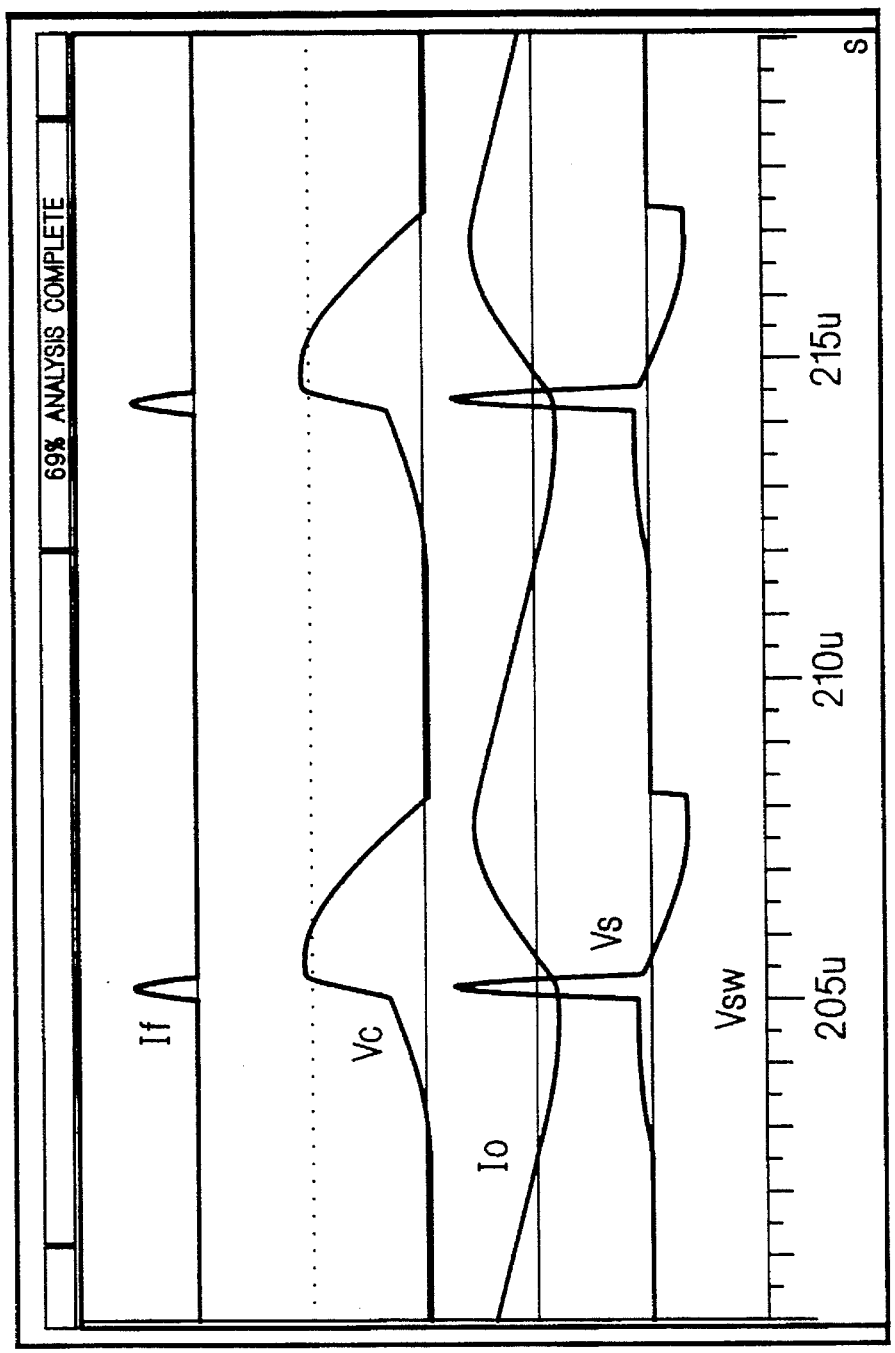
FIG. 19–22 show operating waveforms for the converter of FIG. 18 under various load conditions.
Figure 20:
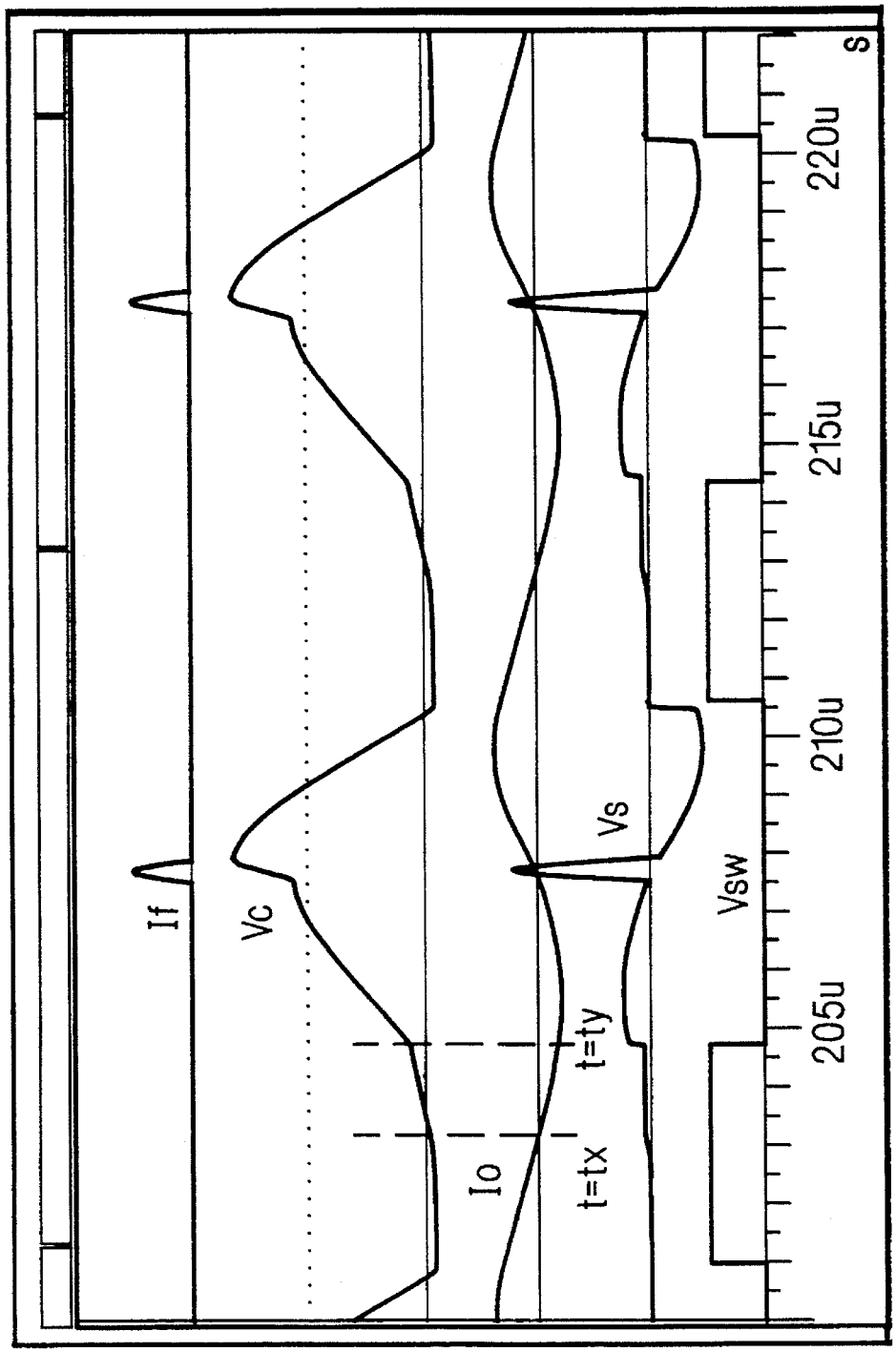
Figure 21:
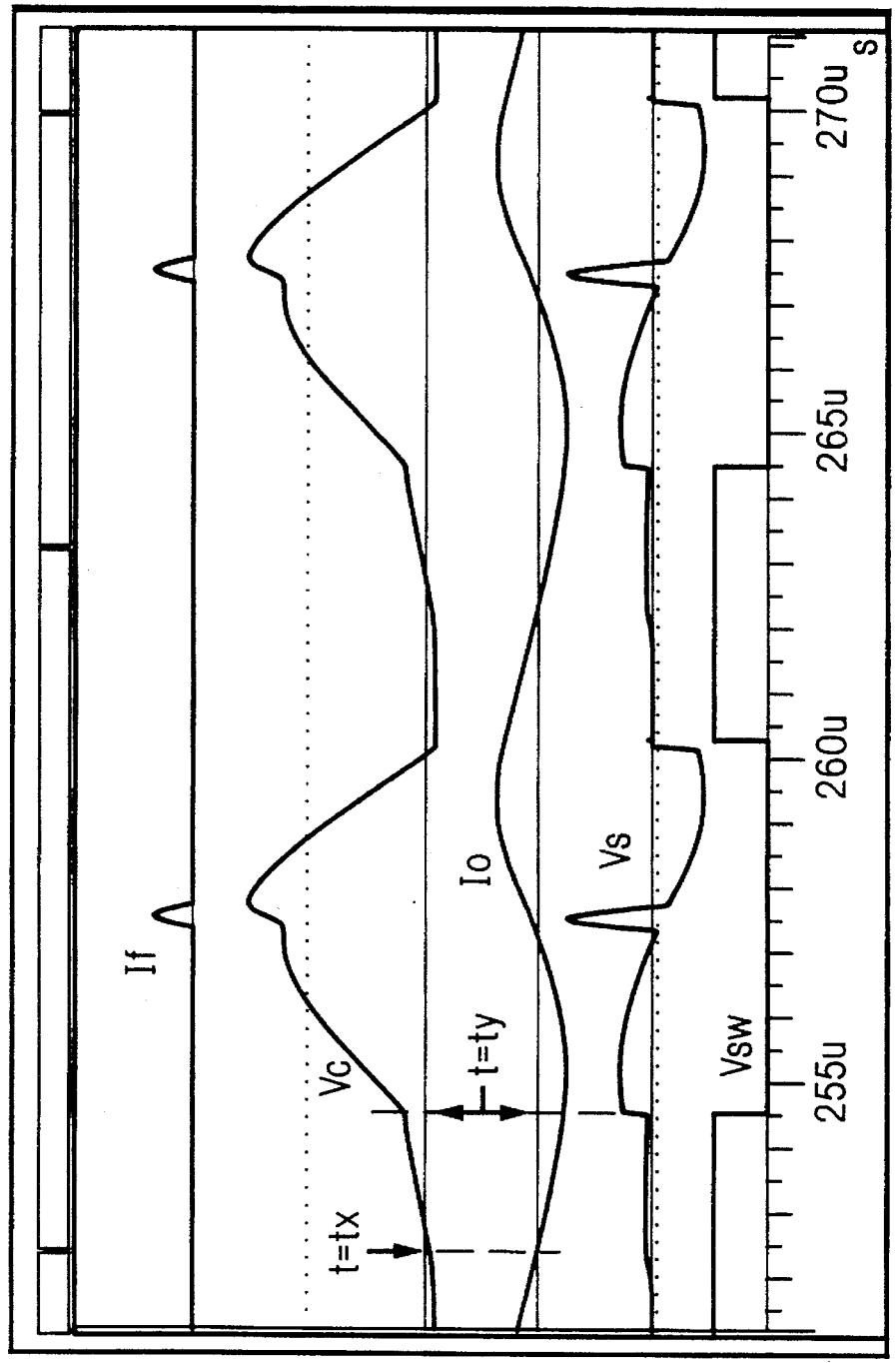
Figure 22:
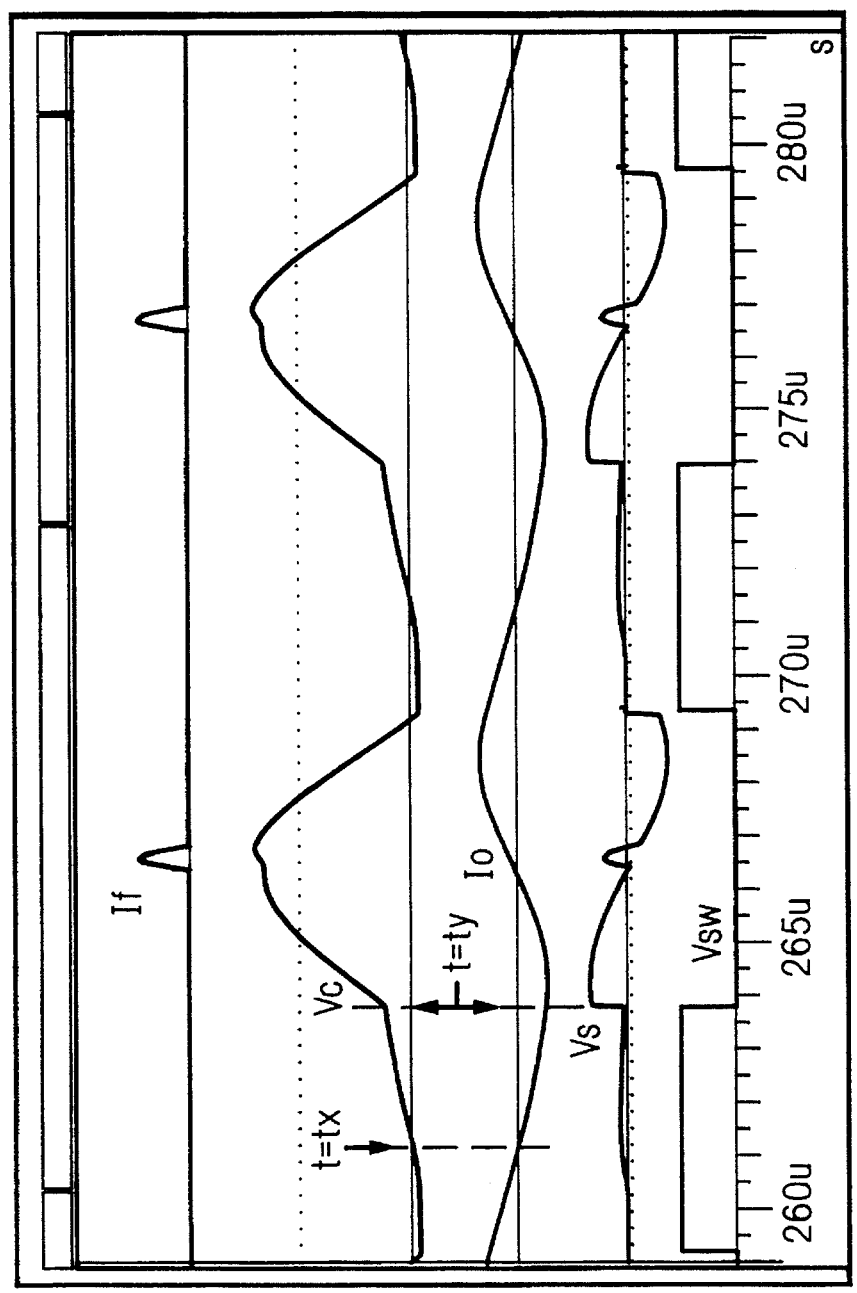

Operating waveforms for the converter of FIG. 18 are shown in FIGS. 19, 20, 21 and 22 at load 300 values of 8.33, 2.5, 1.25 and 0.025 Watts, respectively. In FIGS. 20, 21 and 22 the phase controller 360 is actively controlling the turn-on and turn-off of switch 841. Initiation of forward energy transfer cycles occurs when the precharge voltage is at a maximum (as indicated by the waveform Vs—initiation of forward energy transfer cycles occurs at a value of Vs essentially equal to zero). Operation of the converter 860 of FIG. 18 differs from operation of the converter 650 of FIG. 11 in that the voltage Vc starts to increase in the converter of FIG. 18 as soon as the current Io reverses direction even when the switch 841 is closed (e.g., between times t=tx and t=ty in FIGS. 20, 21 and 22, when Vsw is high). This is, of course, due to the finite value, R=1 ohm, of the resistance 810. Subsequent to the switch 841 opening there is a reverse resonant energy transfer between the output inductor 224 and the capacitor 220, as described previously, and this precharges the capacitor 220. As also described earlier, the phase controller 360 adjusts the turn-off time of the switch 841 to occur sufficiently in anticipation of the initiation of forward energy transfer cycles so that energy transfer cycles occur when the precharge voltage is at a maximum. This operating mode, in which the phase controller 360 actively controls the opening and closing of a boost switch 841 having a non-negligible amount of on-resistance, will be referred to as the damped anticipatory reverse boost mode of operation. In FIG. 19, the load has been raised to a level such that the converter is operating in the transition mode, also described earlier. The switch is inactive (as indicated by the voltage Vsw being at zero volts) and forward energy transfer cycles are initiated prior to Vc reaching a maximum value (in response to reverse flow of current Io). Operation of the converters of FIGS. 11 and 18 will be essentially identical in the transition mode of operation.

The table in FIG. 23 compares the performance of four converters operating in different modes at essentially no-load conditions. In all cases, the component and other operating parameters for the converters are as described above. In all cases the converter load is 25 milliWatts (5 VDC output at 5 milliampere load). The table compares three operating characteristics: converter operating frequency; peak to peak variation in the converter output current, Io, which will directly affect converter output ripple (because the AC components of this current flow in the converter output filter capacitors); and dissipation in the boost switching element (e.g., switch 28, FIG. 2; switch 252, FIG. 3; switch 641, FIG. 11; switch 841, FIG. 18). For the converters whose performance is shown in the rows labeled "damped reverse boost" (e.g., the converter of FIG. 3) and "reverse boost" (e.g., the converter of FIG. 2), the boost switches (28, 252, FIGS. 2 and 3) are turned on when the capacitor 20 voltage declines to zero and are turned off at essentially the same time that the main switch 26 is turned on.

As shown in the table of FIG. 23, both of the converters according to the invention operate at substantially higher frequencies than their prior-art counterparts. Both also exhibit essentially equal values of peak-to-peak output current, and these values are lower than those for the prior art converters. For comparable values of switch resistance, the converters according to the invention exhibit markedly lower values of switch dissipation.

In practical converter embodiments, the small penalty paid in switch power dissipation in the converters of FIGS. 17A, 17B, and 18 (i.e., the damped anticipatory reverse boost converters) relative to the converters of FIGS. 4A, 4B and 11 (i.e., the anticipatory reverse boost converters), will typically be offset by other factors. Achieving the very low values of on-resistance needed to approach anticipatory reverse boost operation requires the use of costly MOSFET switches having large die areas. Presently MOSFET switches having on-resistance values in the neighborhood of 1 Ohm, and capable of handling several amperes of current, are readily available from many vendors, whereas switches having an on-resistance value in the neighborhood of 10 milliOhms are considered state-of-the-art, are substantially larger in die area and are much more costly. Smaller die also allow design and manufacture of smaller converters, especially where non-standard packaging of the die is utilized (see, for example, Vinciarelli, "Packaging Electrical Components", U.S. patent application Ser. No. 07/914,347, incorporated by reference).

Comparison of FIGS. 7, 8, 9, 10 and 12 (anticipatory reverse boost converter) to FIGS. 19 through 22 (damped anticipatory reverse boost converter) indicates another benefit of finite switch resistance. The waveforms for the anticipatory reverse boost converter (having a 10 milliOhm switch operating in the anticipatory reverse boost mode) show that a reduction in load from 6.3 Watts to 0.025 Watts actually results in an increase in converter operating frequency from 99 kilohertz to 103 kilohertz. This is because the precharge strategy used in anticipatory reverse boost is so effective that small reductions in load power result in reductions in forward energy transfer which are greater than that which would be consistent with a reduction in operating frequency. While not troublesome in the specific converter embodiment described above, it is possible that, in alternate embodiments, a non-monotonic behavior of frequency with load might result in closed-loop instability issues. By comparison, the waveforms for the damped anticipatory reverse boost converter (having a 1 Ohm switch operating in the damped anticipatory reverse boost mode), show a smooth decline in operating frequency from 103 KiloHertz to 98 KiloHertz as load drops from 2.5 Watts to 0.025 Watts. Introduction of finite on-resistance (810, FIG. 18) produces a combination of circuit damping (on the circuit formed by the capacitor 220, the on-resistance 810 and the output inductor 224) and loss sufficient to maintain a monotonic decrease in frequency as load decreases.

In summary, damped anticipatory reverse boost is useful because converter embodiments in which it is employed may be made smaller and lower in cost than prior art converters; will exhibit lower output ripple voltage at light loads for a given amount of output filter capacitance; will exhibit minimum operating frequency performance comparable to that found in converters without a resistive boost switching element; and can be designed to exhibit predictable, monotonic, behavior in operating frequency as a function of load. Furthermore, since the inherent on-resistance of low cost MOSFET switches may be exploited to embody the on-resistance 810 itself, there is typically no penalty associated with increased converter parts count and complexity in such a converter.

Other embodiments are within the following claims:

What is claimed is:

1. A power conversion circuit comprising an in input port for connection to a power source;

an output port;

a transformer having a primary winding, a secondary winding, and an effective secondary leakage inductance L2e;

a capacitance C connected on a secondary side of said transformer;

a first switching device connected to be opened and closed to transfer energy from said power source via said effective leakage inductance to charge said capacitance during a forward energy transfer cycle having a characteristic time scale of pi*sqrt (L2e*C); and control circuitry connected to control a reverse current flowing in a direction from said output port toward said capacitance to precharge said capacitance at selected times other than during said forward energy transfer cycle.

2. The circuit of claim 1 wherein said control circuitry is configured to govern said selected times of said precharge relative to the onset of said forward energy transfer cycle.

3. The circuit of claim 1 wherein said control circuitry comprises a second switching device.

4. The circuit of claim 3 wherein said precharge is begun by said second switching device being opened in anticipation of the onset of said forward energy transfer cycle.

5. The circuit of claim 3 wherein said second switching device is connected in said secondary side.

6. The circuit of claim 3 wherein said second switching device is connected in parallel with said capacitance.

7. The circuit of claim 3 wherein said second switching device comprises an essentially lossless switch.

8. The circuit of claim 3 wherein said second switching device has a finite resistance.

9. The circuit of claim 7 or 8 further comprising a load connected to said output port to receive energy from said capacitance, an inductor connected to carry current between said capacitance and said load, and a unidirectional conducting device connected across said second switching device and poled to conduct current in the direction of said load.

10. The circuit of claim 3, 7, or 8 further comprising an inductor connected to carry current between said capacitance and said output port, and wherein said second switching device comprises a MOSFET.

11. The circuit of claim 7 or 8 further comprising a load connected to said output port to receive energy from said capacitance, and a unidirectional conducting device connected across said MOSFET and poled to conduct current in a direction opposite to the direction of conduction of said MOSFET.

12. The circuit of claim 3 wherein said second switching device comprises a switch and a finite resistance external to said switch.

13. The circuit of claim 3 wherein said second switching device comprises a MOSFET and a finite resistance external to said MOSFET.

14. The circuit of claim 1 wherein said capacitance is connected in series with said secondary winding.

15. The circuit of claim 1 further comprising a unidirectional conducting device connected in series with said secondary winding and oriented to conduct during conduction by said first switching device.

16. The circuit of claim 1 wherein said control circuitry includes a port for receiving a signal indicative of a rate of change of voltage across said capacitance, said signal being used in controlling said precharging.

17. The circuit of claim 1 wherein said control circuit includes a port for receiving a signal indicative of the time of initiation of said forward energy transfer cycle, and said signal being used in controlling said precharge.

18. The circuit of claim 16 or 17 further comprising a load connected to said output port to receive energy from said capacitance.

19. The circuit of claim 18 further comprising an inductor connected to carry current between said capacitance and said load.

20. A power conversion circuit comprising an input port for connection to a power source;

a transformer having a primary winding, a secondary winding, and an effective secondary leakage inductance $L2e$;

a capacitance C connected on a secondary side of said transformer;

a unidirectional conducting device connected in series with said secondary winding and oriented to conduct during conduction by said first switching device;

an inductor connected to conduct current between said capacitance and a load;

an output port for connection to said load;

a first switching device connected to be opened and closed to transfer energy from said power source via said effective leakage inductance to charge said capacitance during forward energy transfer cycles having a characteristic time scale of pi*sqrt($L2e$*C);

control circuitry connected to cause a reverse current flowing in a direction from said output port toward said capacitance to precharge said capacitance in anticipation of the initiation of said forward energy transfer cycle, said control circuitry including a second switching device connected in parallel with said capacitance and in series with said inductor, and controlled to be opened in anticipation of the initiation of said forward energy transfer cycle, a port for receiving a signal indicative of a rate of change of voltage across said capacitance, and a port for receiving a signal indicative of the time of initiation of said forward energy transfer cycle.

21. A method for operating a power conversion circuit of the kind comprising:

a port for connection toga power source;

a transformer having a primary winding, a secondary winding, and an effective secondary leakage inductance $L2e$;

a capacitance C connected on a secondary side of said transformer;

an inductor connected to conduct current between said capacitance and said load;

a first switching device connected to be opened and closed to transfer energy from said power source via said effective leakage inductance to charge said capacitance during a forward energy transfer cycle having a characteristic time scale of pi*sqrt($L2e$*C); and control circuitry including a second switching device connected to control precharging of said capacitance at selected times other than during said forward energy transfer cycle;

said method comprising operating said circuit in a mode having a conversion operating cycle of which said forward energy transfer cycle comprises a portion, said operating cycle also including a portion in which reverse current flowing from said load in said inductor is available to charge said capacitance; and operating said second switching device to route said reverse current to said capacitor to achieve said precharging.

22. The method of claim 21 further comprising:

turning said first switching device on at times when current through said first switching device is essentially zero.

23. The method of claim 21 further comprising:

turning said first switching device off at times when current through said first switching device is essentially zero.

24. The method of claim 22 or 21 further comprising:

controlling a frequency of switching of said first switching device to maintain an output voltage of said circuit at a predetermined value.

25. The method of claim 21 wherein:

a condition for turning on said second switching device is approximately an occurrence of a time when a voltage across said capacitance is essentially zero.

26. The method of claim 21 wherein:

said second switching device is turned off approximately at a time such that a subsequent said forward energy transfer cycle will tend to begin when a voltage across said capacitance is at a maximum.

27. The method of claim 26 wherein:

said time occurs briefly prior to when said voltage across said capacitance is at said maximum.

28. The method of claim 26 wherein:

said maximum comprises the first maximum to occur following the time when said second switching device is turned off.

29. The method of claim 21 wherein:

said precharging is disabled in periods when said reverse current does not flow during said conversion operating cycle.

30. A method of operating a power conversion circuit of the kind comprising:

a port for connection to a power source;

a transformer having a primary winding, a secondary winding, and an effective secondary leakage inductance $L2e$;

a capacitance C connected on a secondary side of said transformer;

a unidirectional conducting device connected in series with said secondary winding and oriented to conduct during conduction by said first switching device;

an inductor connected to conduct current between said capacitance and a load;

a port for connection to said load;

a first switching device connected to be opened and closed to transfer energy from said power source via said effective leakage inductance to charge said capacitance during forward energy transfer cycles having a characteristic time scale of pi*sqrt($L2e$*C);

control circuitry connected to cause precharging of said capacitance in anticipation of the initiation of said forward energy transfer cycle, said control circuitry including a second switching device connected in parallel with said capacitance and in series with said inductor, and controlled to be opened in anticipation of the initiation of said forward energy transfer cycle, a port for receiving a signal indicative of a rate of change of voltage across said capacitance, and a port for receiving a signal indicative of the time of initiation of said forward energy transfer cycle;

said method comprising operating said circuit in a mode having a series of conversion operating cycles, each of said conversion operating cycles having a forward energy transfer cycle and a portion in which reverse current flowing from said load is available to charge said capacitance;

turning on and turning off said first switching device at times when current through said first switching device is essentially zero;

controlling the frequency of switching of said first switching device to maintain an output voltage of said circuit at a predetermined value;

controlling the opening and closing of said second switching device to route said reverse current to said capacitance to achieve precharging;

wherein a condition for turning on said second switching device is the approximate occurrence of a time during each of said operating cycles when a voltage across said capacitance is essentially zero; and said second switching device is turned off approximately at a time during each of said operating cycles such that subsequent said forward energy transfer cycles will tend to begin when a voltage across said capacitance is at a maximum.

31. The method of claim 30 wherein:

said maximum comprises the first maximum to occur following the time when said second switching device is turned off.

* * * * *

UNITED STATES PATENT AND TRADEMARK OFFICE
CERTIFICATE OF CORRECTION

PATENT NO. : 5,623,397

DATED : April 22, 1997

INVENTOR(S) : Patrizio Vinciarelli

It is certified that error appears in the above-identified patent and that said Letters Patent is hereby corrected as shown below:

First page, Section [56] "References Cited", under subsection "U.S. Patent Documents", after "4,441,146" the following patent should be listed:

--4,931,716   06/05/90   Javanovic   323/285--;

after subsection "U.S. Patent Documents" add the section --Foreign Patent Documents--, under which the following documents should be listed:

--0 564 289 A2   10/06/93   Europe
WO 93/12581      06/24/93   PCT--.

Col. 7, line 34, after "360" change "Opens" to --opens--.

Col. 7, line 41, change "opening the boost switch" to --opening of the boost switch--.

Col. 12, line 6, change "sufficient" to --sufficiently--.

Col. 12, line 67, change "Steady" to --steady--.

Col. 15, line 39, change "seeks" to --seek--.

Col. 15, line 50, change "(FIG. 2B)" to --(FIG. 12B)--.

UNITED STATES PATENT AND TRADEMARK OFFICE
CERTIFICATE OF CORRECTION

PATENT NO. : 5,623,397

DATED : April 22, 1997

INVENTOR(S) : Patrizio Vinciarelli

It is certified that error appears in the above-identified patent and that said Letters Patent is hereby corrected as shown below:

Col. 19, line 15, change both occurrences of "kilohertz" to --kiloHertz--.

Claim 1, line 1, after "an" delete "in".

Claim 18, line 1, after "claim" insert --1,--.

Claim 21, line 3, after "connection", change "toga" to --to a--.

Signed and Sealed this

Twenty-fifth Day of August, 1998

Attest:

Attesting Officer

BRUCE LEHMAN

Commissioner of Patents and Trademarks